United States Patent [19]

Ishikawa et al.

[11] Patent Number: 5,848,407
[45] Date of Patent: Dec. 8, 1998

[54] HYPERTEXT DOCUMENT RETRIEVING APPARATUS FOR RETRIEVING HYPERTEXT DOCUMENTS RELATING TO EACH OTHER

[75] Inventors: Masato Ishikawa, Tokyo; Mitsuhiro Sato, Yokohama; Masaki Hoshida, Tokyo; Yoshihiro Noguchi, Ichikawa; Hideki Yasukawa, Tokyo, all of Japan

[73] Assignee: Matsushita Electric Industrial Co., Ltd., Osaka, Japan

[21] Appl. No.: 861,603

[22] Filed: May 22, 1997

[30] Foreign Application Priority Data

May 22, 1996 [JP] Japan .................................. 8-149783

[51] Int. Cl.$^6$ .................................................. G06F 17/30
[52] U.S. Cl. ................................. 707/2; 707/5; 707/104
[58] Field of Search .............................. 707/1–3, 5, 10, 707/104, 501, 513

[56] References Cited

U.S. PATENT DOCUMENTS

| | | | |
|---|---|---|---|
| 5,162,992 | 11/1992 | Williams | 707/2 |
| 5,598,557 | 1/1997 | Doner et al. | 707/5 |
| 5,630,117 | 5/1997 | Oren et al. | 707/100 |
| 5,642,502 | 6/1997 | Driscoll | 707/5 |
| 5,694,592 | 12/1997 | Driscoll | 707/3 |
| 5,694,594 | 12/1997 | Chang | 707/6 |
| 5,754,939 | 5/1998 | Herz et al. | 455/4.2 |
| 5,761,418 | 6/1998 | Francis et al. | 395/200.31 |
| 5,768,578 | 6/1998 | Kirk et al. | 395/611 |

OTHER PUBLICATIONS

Gerard Salton, Introduction to Modern Information Retrieval: Text Analysis and Automatic Indexing (Chap. 3), Mc Graw–Hill, 1983, pp. 52–111.

*Primary Examiner*—Maria N. Von Buhr
*Attorney, Agent, or Firm*—Lowe Hauptman Gopstein Gilman & Berner

[57] ABSTRACT

A hypertext document and anchor sentences of parent documents for the hypertext document are registered with an hypertext document identifier as document information for each of hypertext documents having reference relationships with each other. A user can refer to one hypertext document according to an anchor sentence of another hypertext document functioning as a parent document. Also, occurrence positions of one word in hypertext documents and parent documents are registered as word information for each of words. When a keyword is input, a plurality of particular hypertext documents and particular parent documents in which the keyword appears are specified according to the word information, one particular hypertext document and corresponding particular parent documents are unified to a unified hypertext document for each particular hypertext document, an occurrence frequency of the keyword in each unified hypertext document is calculated according to the document information, importance degrees of the unified hypertext documents are calculated as those of the particular hypertext documents according to the occurrence frequencies, and ranking of the particular hypertext documents are determined according to those importance degrees. Because the occurrence frequency is calculated by considering the parent documents, the particular hypertext documents can be appropriately ranked.

16 Claims, 14 Drawing Sheets

| WORD | APPLE | |
|---|---|---|
| OCCURRENCE DOCUMENT UNIT | OCCURRENCE DOCUMENT IDENTIFIER | OCCURRENCE POSITION |
| | 000083 | (TITLE, 1)<br>(BODY, 4, 33, 43)<br>(000081, 1)<br>(000082, 4) |
| | | |
| | | |
| | | |

RETRIEVAL RESULT

KEYWORD : "APPLE"
    30 DOCUMENTS ARE DISPLAYED

RANK (4)    INDEX OF HYPERTEXT DOCUMENT D80

INDEX OF HYPERTEXT DOCUMENT D81

INDEX OF HYPERTEXT DOCUMENT D83  ☆

⋮

(18)    INDEX OF HYPERTEXT DOCUMENT D81

INDEX OF HYPERTEXT DOCUMENT D83

INDEX OF HYPERTEXT DOCUMENT D85  ☆

(19)    INDEX OF HYPERTEXT DOCUMENT D81

INDEX OF HYPERTEXT DOCUMENT D83

INDEX OF HYPERTEXT DOCUMENT D86  ☆

RETRIEVAL RESULT

KEYWORD : "APPLE"
30 DOCUMENTS ARE DISPLAYED

RANK (4) INDEX OF HYPERTEXT DOCUMENT D80

INDEX OF HYPERTEXT DOCUMENT D81

INDEX OF HYPERTEXT DOCUMENT D83 ☆

SUMMARY OF
HYPERTEXT DOCUMENT D83

⋮

(18) INDEX OF HYPERTEXT DOCUMENT D81

INDEX OF HYPERTEXT DOCUMENT D83

INDEX OF HYPERTEXT DOCUMENT D85 ☆

SUMMARY OF
HYPERTEXT DOCUMENT D85

(19) INDEX OF HYPERTEXT DOCUMENT D81

INDEX OF HYPERTEXT DOCUMENT D83

INDEX OF HYPERTEXT DOCUMENT D86 ☆

SUMMARY OF
HYPERTEXT DOCUMENT D86

RETRIEVAL RESULT

KEYWORD : "APPLE"
30 DOCUMENTS ARE DISPLAYED

RANK
(4)   INDEX OF HYPERTEXT DOCUMENT D80
        INDEX OF HYPERTEXT DOCUMENT D81
          INDEX OF HYPERTEXT DOCUMENT D83  ☆
            INDEX OF HYPERTEXT DOCUMENT D85  ☆
              INDEX OF HYPERTEXT DOCUMENT D86  ☆

⋮

| APPLE | CLEAR | INITIAL CONDITION | RE-RETRIEVAL |

| AOMORI | NAGANO | OLIMPICS | FESTIVAL | NEBUTA | SHINSHU |
| FARMER | PRODUCT | MANURE | FARM |

FIG. 21

RETRIEVAL RESULT

KEYWORD : "APPLE"
30 DOCUMENTS ARE DISPLAYED

RANK
(4)   INDEX OF HYPERTEXT DOCUMENT D80
        INDEX OF HYPERTEXT DOCUMENT D81
          INDEX OF HYPERTEXT DOCUMENT D83  ☆
            INDEX OF HYPERTEXT DOCUMENT D85  ☆
              INDEX OF HYPERTEXT DOCUMENT D86  ☆

⋮

| APPLE | CLEAR | INITIAL CONDITION | RE-RETRIEVAL |

| SHINSHU | FARMER | PRODUCT | AOMORI | MANURE | FARM |
| FESTIVAL | NEBUTA | NAGANO | OLYMPICS |

HYPERTEXT DOCUMENT RETRIEVING APPARATUS FOR RETRIEVING HYPERTEXT DOCUMENTS RELATING TO EACH OTHER

BACKGROUND OF THE INVENTION

1. Field of the Invention

The present invention relates generally to a hypertext document retrieving apparatus, and more particularly to a hypertext document retrieving apparatus in which a plurality of hypertext documents likely to meet a user's retrieval request are retrieved from a large volume of hypertext documents and are presented to the user.

2. Description of the Related Art

2.1 Previously Proposed Art

As a conventional apparatus in which one or more documents likely to meet a user's retrieval request are retrieved from a large volume of documents and are presented to the user, a document retrieving apparatus 200 shown in FIG. 1 is known. In this apparatus 200, a large volume of documents stored in a document managing unit 201 are analyzed in advance in a retrieval index developing unit 202, and it is examined how many times each of a plurality of words registered in a dictionary of the retrieval index developing unit 202 appears in each of the documents. That is, an occurrence frequency of each word in one document is calculated for each of the documents stored in the document managing unit 201, a deviation degree IDF of one word in the total documents is calculated as a correction factor for the word for each of the words, a normalized occurrence frequency (called a TF value) of each word is calculated for each of the documents, an estimated value of each document expressed by TF*IDF is calculated for each of the words by multiplying the deviation degree and the normalized occurrence frequency together, and a retrieval index is developed in the retrieval index developing unit 202. In the retrieval index, a set of one word, identification data indicating one or more documents in which the word appears and one estimated value for the word is registered for each of the words.

Thereafter, when a plurality of keywords input by a user 207 are received in a keyword input unit 203, the keywords are transmitted to a retrieving unit 204. In the retrieving unit 204, a plurality of retrieval words agreeing with the input keywords are found out from the retrieval index stored in the retrieval index developing unit 202, a particular set of one retrieval word, identification data indicating one or more retrieval documents in which the retrieval word appears and one estimated value for the retrieval word is taken out for each of the retrieval words from the retrieval index developing unit 202, and the particular sets corresponding to the keywords are transmitted to a document ranking determining unit 205.

In the document ranking determining unit 205, a plurality of identification titles indicating the retrieval documents are arranged in decreasing order of the estimated values of the retrieval documents to determine the ranking of the retrieval documents, and the identification titles arranged according to the ranking of the retrieval documents are displayed as a retrieval result in a retrieval result displaying unit 206. Thereafter, when the user selects the identification titles displayed on the displaying unit 206 one after another in the arranged order, the retrieval document indicated by the selected identification title is read out from the document managing unit 201 to the displaying unit 206 each time one identification title is selected, and the retrieval document is displayed on the retrieval result displaying unit 206 each time one identification title is selected.

Therefore, because the keywords according to a user's retrieval request are input by the user, a plurality of documents likely to meet the user's retrieval request can be presented in the order of the estimated value TF*IDF.

A plurality of calculation methods of the estimated value TF*IDF are known. As an example of one calculation method, the deviation degree IDF (=1−log Nw/N) obtained by subtracting a logarithmic value (log Nw/N) of the ratio from 1 is defined. Here, the symbol Nw denotes the number of documents in which a remarked word appears, and the symbol N denotes the number of documents stored in the document managing unit 201. Also, the normalized occurrence frequency TF (=Fo/Nwd) obtained by dividing an occurrence frequency Fo of the remarked word in a remarked document by the number Nwd of words appearing in the remarked document is defined. In this case, the estimated value TF*IDF is calculated by multiplying the deviation degree and the normalized occurrence frequency together.

The detail of the estimated value TF*IDF and a conventional document retrieving apparatus in which the estimated value TF*IDF is used are disclosed in a literature "Salton, Gerard: Introduction to modern Information Retrieval, McGraw-Hill computer science series, 1983).

2.2. Problems to be Solved by the Invention

However, in cases where one or more particular hypertext documents likely to meet a user's retrieval request are retrieved from a large volume of hypertext documents by using the conventional document retrieving apparatus, because the hypertext documents are not generally independent from each other but the hypertext documents often have reference relationships with each other, there is a drawback that the ranking of the particular hypertext documents likely to meet the user's retrieval request cannot be appropriately determined. That is, because contents of a plurality of particular hypertext documents having a referential relationship with each other are often connected with a consistent meaning, the contents of the particular hypertext documents cannot be understood by reading only one particular hypertext document but be understood by reading all of the particular hypertext documents. Therefore, in cases where one or more particular hypertext documents likely to meet a user's retrieval request are retrieved by using the conventional document retrieving apparatus, an importance degree of each particular hypertext document is erroneously estimated, so that there is a drawback that the ranking of the particular hypertext documents cannot be appropriately determined. Also, even though the particular hypertext documents ranked according to their estimated values are displayed, because the ranking of the particular hypertext documents is not appropriately determined, there is another drawback that the user cannot smoothly select the particular hypertext documents in an appropriate importance degree order.

In particular, because a possibility that a plurality of hypertext documents written in a hypertext mark-up language (HTML) in a world wide web have a referential relationship with each other is considerably high, the ranking of the particular hypertext documents cannot be appropriately determined, and the user cannot smoothly select each of the particular hypertext documents even though the particular hypertext documents ranked according to their estimated values are displayed.

SUMMARY OF THE INVENTION

An object of the present invention is to provide, with due consideration to the drawbacks of such a conventional document retrieving apparatus, a hypertext document retrieving apparatus in which one or more hypertext documents likely to meet a user's retrieval request are retrieved from a large volume of hypertext documents and are appropriately ranked according to their importance degrees to smoothly select each of the hypertext documents even though the hypertext documents are written in the hypertext mark-up language in the world wide web.

To achieve the object of the present invention, in a hypertext document retrieving apparatus, a plurality of particular hypertext documents likely to meet a user's retrieval request are retrieved from a group of hypertext documents having reference relationships with each other in which one hypertext document having an anchor sentence functions as a parent document for another hypertext document functioning as a reference document and a user refers to one reference document after the user selects one anchor sentence of one parent document corresponding to the reference document.

In detail, in hypertext document table preparing means, hypertext document information, in which one hypertext document identifier identifying one hypertext document, a body of the hypertext document, a parent document identifier identifying a parent document corresponding to the hypertext document functioning as one reference document and an anchor sentence of the parent document are registered, is prepared for each of the hypertext documents, and a hypertext document table of the hypertext document information for all hypertext documents is prepared in advance.

Thereafter, in retrieval index preparing means, a plurality of words appearing in each of the hypertext documents and the parent documents are recognized according to the hypertext document table prepared by the hypertext document table preparing means, a plurality of occurrence positions of the words in each of the hypertext documents and the parent documents are recognized according to the hypertext document table, word information, composed of one or more occurrence document identifiers identifying one or more hypertext documents in which one word appears and occurrence positions of the word in the hypertext documents and one or more anchor sentences of one or more parent documents corresponding to the hypertext documents, is prepared for each of the words, and a retrieval index of pieces of word information for the words is prepared in advance.

Thereafter, when a keyword indicating the user's retrieval request is received in keyword receiving means, particular word information corresponding to the keyword is retrieved in retrieving means from the retrieval index prepared by the retrieval index preparing means. Also, a plurality of particular occurrence document identifiers identifying a plurality of particular hypertext documents in which the keyword appears and a plurality of particular occurrence positions of the keyword in the particular hypertext documents and one or more particular anchor sentences of one or more particular parent documents corresponding to the particular hypertext documents are retrieved from the particular word information.

Thereafter, in document ranking determining means, the particular hypertext documents identified by the particular occurrence document identifiers are specified, pieces of particular hypertext document information for the particular hypertext documents are retrieved from the hypertext document table prepared by the hypertext document table preparing means, one particular hypertext document and one or more particular parent documents corresponding to the particular hypertext document are unified to a unified hypertext document for each of the particular hypertext documents, an occurrence frequency of the keyword in one unified hypertext document is calculated for each unified hypertext document, a plurality of importance degrees of the unified hypertext documents are determined according to the occurrence frequencies in the unified hypertext documents, one importance degree of one unified hypertext document is set as an importance degree of one particular hypertext document corresponding to the unified hypertext document for each unified hypertext document, and the ranking of the particular hypertext documents is determined according to the importance degrees of the unified hypertext documents.

Thereafter, a plurality of indexes of the particular hypertext documents are displayed by retrieval result displaying means in a ranked order corresponding to the ranking of the particular hypertext documents as a retrieval result.

Because one unified hypertext document is prepared by unifying one particular hypertext document and one or more particular parent documents corresponding to the particular hypertext document for each of the particular hypertext documents and one importance degree of one unified hypertext document is calculated as one importance degree of one particular hypertext document corresponding to the unified hypertext document for each of the unified hypertext documents, the ranking of the particular hypertext documents can be determined by considering the particular parent documents having the reference relationships with the articular hypertext documents. Therefore, even though contents of a plurality of specific hypertext documents having a referential relationship with each other are connected with a consistent meaning, the specific hypertext documents likely to meet the user's retrieval request can be correctly retrieved from a large volume of hypertext documents and be appropriately ranked according to their importance degrees, so that the user can smoothly select the specific hypertext documents in an appropriate importance degree order even though the specific hypertext documents are written in the hypertext mark-up language in the world wide web.

BRIEF DESCRIPTION OF THE DRAWINGS

The objects, features and advantages of the present invention will be apparent from the following description taken in conjunction with the accompanying drawings, in which:

FIG. 7 shows an example of a retrieval result in which an index of one particular hypertext document is displayed with an index of a first-stage particular parent document and an index of a second-stage particular parent document for each particular hypertext document by a retrieval result displaying unit shown in FIG. 6;

FIG. 12 shows an example of a retrieval result in which an index of one particular hypertext document is displayed with a summary of the particular hypertext document, an index of a first-stage particular parent document and an index of a second-stage particular parent document for each particular hypertext document by a retrieval result displaying unit shown in FIG. 11;

FIG. 19 shows an example of a retrieval result, in which indexes of hypertext documents and buttons corresponding to a plurality of high-ranking related words are displayed, according to the tenth embodiment;

FIG. 21 shows an example of a retrieval result, in which indexes of hypertext documents and buttons corresponding to a plurality of high-ranking related words are displayed, according to the eleventh embodiment.

DETAILED DESCRIPTION OF THE EMBODIMENTS

Preferred embodiments of a hypertext document retrieving apparatus, in which one or more particular hypertext documents likely to meet a user's retrieval request are retrieved from a large volume of hypertext documents distributively managed in a world wide web of an internet are described with reference to drawings according to the concept of the present invention.

Figure 1:
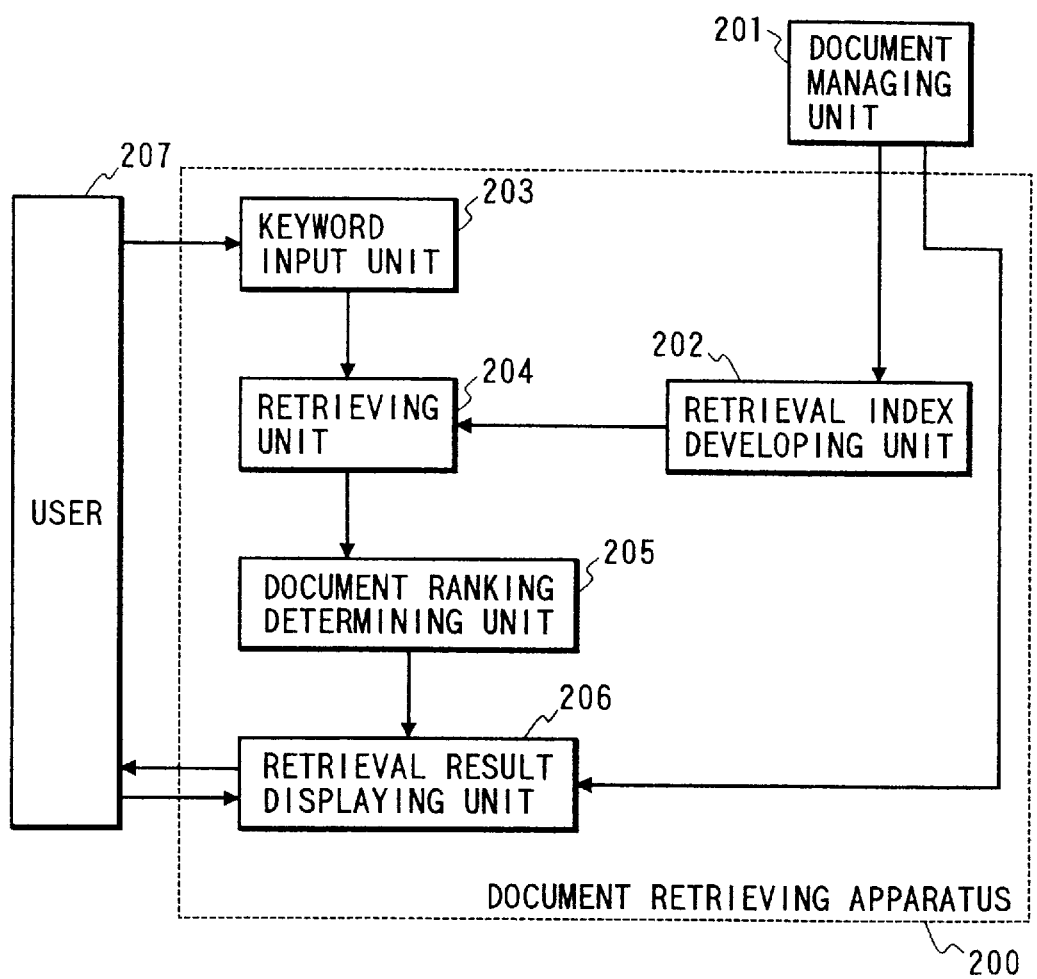
FIG. 1 is a block diagram of a conventional document retrieving apparatus.
Figure 2:
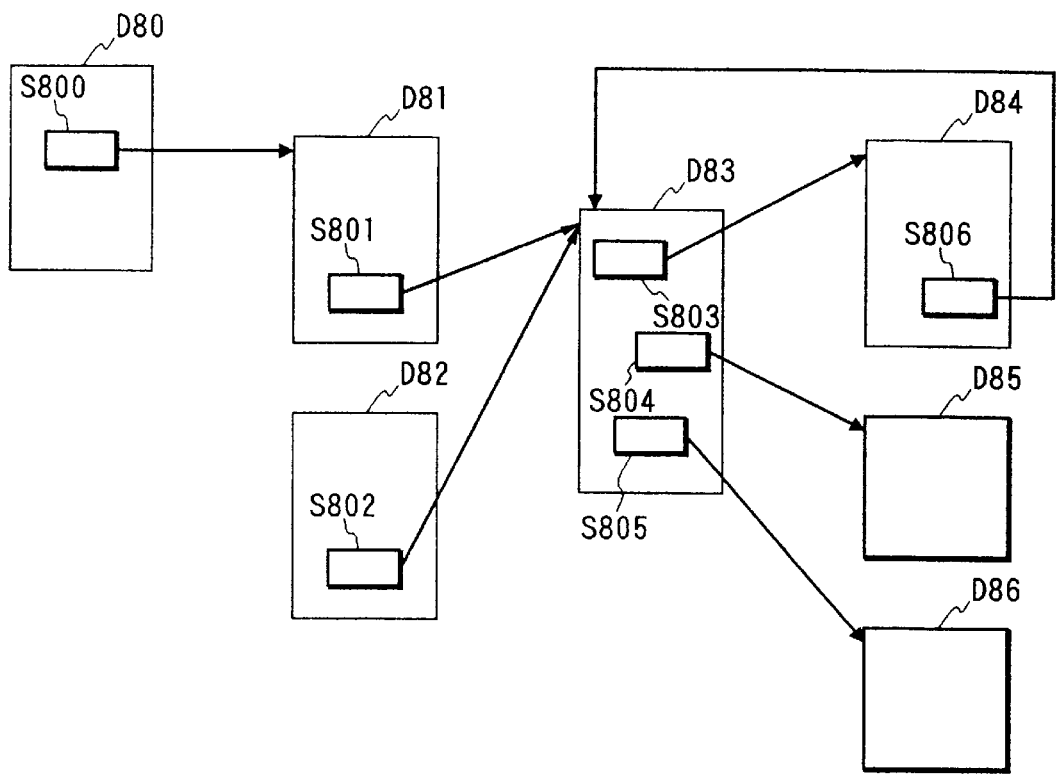
FIG. 2 shows a reference relationship among a plurality of hypertext documents distributively managed in a world wide web of an internet.

FIG. 2 shows a reference relationship among a plurality of hypertext documents distributively managed in a world wide web of an internet.

As shown in FIG. 2, a plurality of hypertext documents D80 to D86 distributively managed in a world wide web of an internet have a referential relationship with each other. That is, an anchor sentence S800 is placed in the hypertext document D80, an anchor sentence S801 is placed in the hypertext document D81, an anchor sentence S802 is placed in the hypertext document D82, a plurality of anchor sentences S803 to S805 are placed in the hypertext document D83, and an anchor sentence S806 is placed in the hypertext document D84. In each of the anchor sentences, either an identifier identifying a document to which a user can make reference or a position of a document to which a user can make reference is buried.

A document to which a user makes reference is called a reference document in this specification, and a document having one anchor sentence which indicates one or more reference documents is called an parent document in this specification. Also, each anchor sentence is composed of one sentence or a plurality of sentences.

Therefore, when a user reads the parent document D81 displayed on a display of a browsed document selecting means (called a browser) and points out a position of the anchor sentence S801 of the parent document D81 by using a so-called pointing device, the reference document D83 is called and displayed, so that the user can efficiently use the distributed hypertext documents D80 to D86.

A group of the hypertext documents D80 to D86 is written in a hypertext mark-up language, and each hypertext document is called a page, and a character string, an image or a program is written in each hypertext document. For example, in cases where the parent document D81 is stored in a file named "farmer.html", the reference document D83 is stored in a file named "apple.html" and an indicator (or a document storing position) indicating a reference to the reference document D83 is buried in a character string "apple producing farmer" written in the parent document D81 to frame the anchor sentence S801, the anchor sentence S801 is expressed by "<a href="apple.html">apple producing farmer </a>". In this case, because any sentence is not written in the reference document D83, there is a case that the document D82 is prepared in a computer placed far from another computer, in which the document D83 prepared before the preparation of the document D81 is stored, and the document D82 functions as an parent document for the reference document D83.

(First Embodiment)

Figure 3:
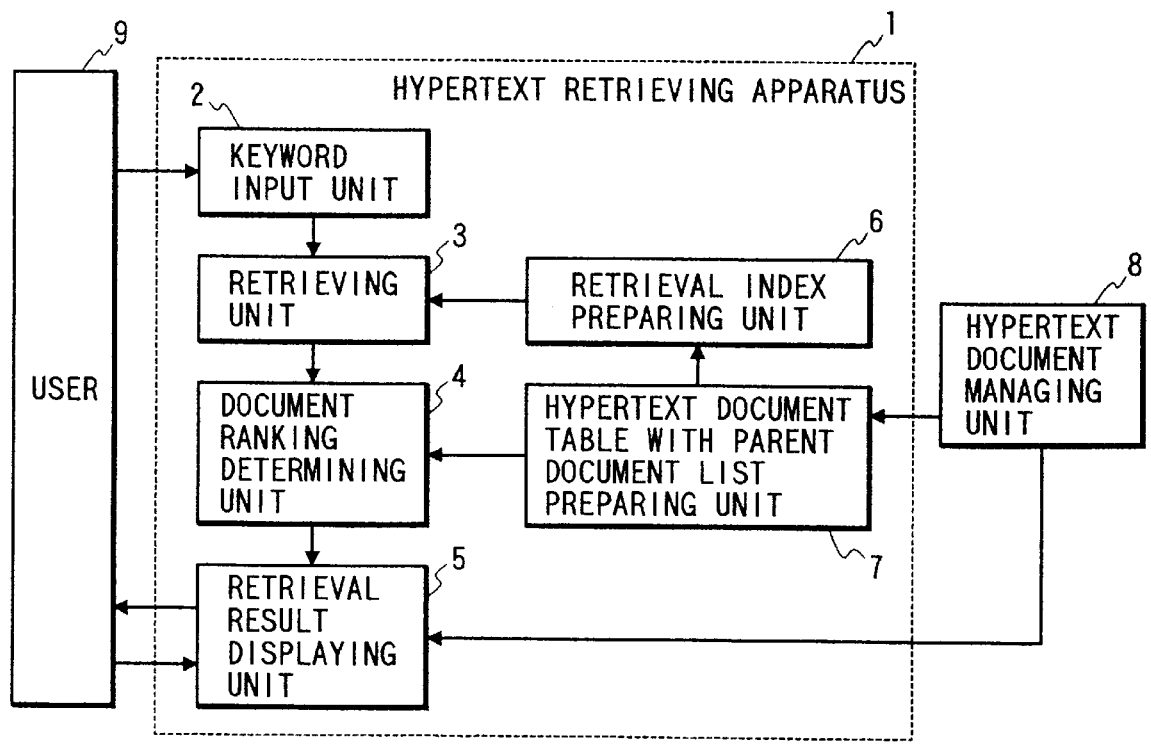
FIG. 3 is a block diagram of a hypertext retrieving apparatus according to a first embodiment of the present invention.

FIG. 3 is a block diagram of a hypertext retrieving apparatus according to a first embodiment of the present invention.

As shown in FIG. 3, a hypertext retrieving apparatus 1 for retrieving one or more hypertext documents likely to meet a user's retrieval request from a large volume of hypertext documents stored in a hypertext document managing unit 8 in which the hypertext documents prepared in a large number of computers widely distributed in a network of a world wide web are distributively managed on condition that the hypertext documents have reference relationships with each other, comprises a hypertext document table with parent document list preparing unit 7 for analyzing the hypertext documents having the reference relationships which are managed by the hypertext document managing unit 8, preparing hypertext document information in which one or more parent document identifiers identifying one or more parent documents and anchor sentences of the parent documents are listed with one hypertext document identifier identifying one hypertext document and a document storing position of the hypertext document, for each of the hypertext documents, and preparing a hypertext document table of the hypertext document information for all hypertext documents managed by the hypertext document managing unit 8, a retrieval index preparing unit 6 having a dictionary for analyzing a body of one hypertext document, a title of the hypertext document and character strings of one or more anchor sentences of one or more parent documents corresponding to the hypertext document in advance for each of the hypertext documents managed by the hypertext document managing unit 8 according to the hypertext document table prepared by the hypertext document table with parent document list preparing unit 7 to recognize a plurality of words appearing in the hypertext documents, preparing a piece of word information for one word in which one occurrence document identifier identifying one hypertext document, in which the word registered in the dictionary appears, and positional information indicating occurrence positions of the word in the title of the hypertext document, the body of the hypertext document and the anchor sentences of the parent documents corresponding to the hypertext document are listed for each of the hypertext documents, and preparing a retrieval index of pieces of word information for the words stored in the dictionary, a keyword input unit 2 for receiving a plurality of keywords input by a user 9, a retrieving unit 3 for retrieving a plurality of pieces of particular word information corresponding to a plurality of particular words agreeing with the keywords received in the keyword input unit 2 from the retrieval index prepared in the retrieval index preparing unit 6 and retrieving particular occurrence document identifiers identifying particular hypertext documents, in which one particular word agreeing with one keyword appears, and particular positional information indicating particular occurrence positions of one particular word in the particular hypertext documents and a plurality of particular parent documents corresponding to the particular hypertext documents from the particular word information for each of the particular words, a document ranking determining unit 4 for unifying one particular hypertext document and one or more particular parent documents corresponding to the particular hypertext document to a unified particular hypertext document according to the document information of the hypertext document table prepared by the hypertext document table with parent document list preparing unit 7 for each of the particular hypertext documents obtained in the retrieving unit 3, calculating an occurrence frequency TF of one particular word in one unified particular hypertext document for each particular word and each unified particular hypertext document, calculating an inverse document frequency IDF defined as an inverse value of the number of particular hypertext documents, in which one particular word appears, for each particular word, calculating a product TF*IDF of one occurrence frequency TF and one inverse document frequency IDF, summing a plurality of products for all particular words to produce a summed product as an estimated value for each unified particular hypertext document, determining a plurality of importance degrees of the unified particular hypertext documents according to the estimated values, determining the ranking of the particular hypertext documents according to the importance degrees for the unified particular hypertext documents and preparing an index of one particular hypertext document for each of the particular hypertext documents, and a retrieval result displaying unit 5 for displaying the indexes of the particular hypertext documents in the ranked order determined in the document ranking determining unit 4 as a retrieval result.

In the above configuration, an operation of the hypertext retrieving apparatus 1 is described. A plurality of hypertext documents having reference relationships with each other are prepared in a large number of computers widely distributed in a network of a world wide web. In the hypertext document managing unit 8, the hypertext documents are distributively managed. The reference document table with parent document preparing unit 7 has a related document collecting function (generally called a web robot). Therefore, when a plurality of document storing position addresses (generally called a plurality of universal resource locators) of a plurality of hypertext documents are given to the reference document table with parent document preparing unit 7, the plurality of hypertext documents are indicated as a plurality of parent documents by the universal resource locator one after another, one or more anchor sentences written in each of the parent documents are analyzed, and one or more reference documents are collected for each of the parent documents. Thereafter, a plurality of hypertext document identifiers not overlapped with each other are allocated to the collected reference documents in the order of collection to identify the collected reference documents. In this case, when any image or program is not written in each of the collected reference documents and a character string is written in each of the collected reference documents, a collecting time can be saved. Also, a plurality of document storing position addresses of the collected reference documents are listed to prohibit that one collected reference document listed is again collected. Therefore, as shown in FIG. 2, though not only the parent document D83 relates to the reference document D84 according to the anchor sentence S803 but also the parent document D84 relates to the reference document D83 according to the anchor sentence S806, it is prohibited that the hypertext documents D83 and D84 are collected twice.

Thereafter, a hypertext document table of pieces of hypertext document information (refer to FIG. 4) in which parent document identifiers of one or more parent documents and anchor sentences of the parent documents are listed for each hypertext document is prepared in the hypertext document table with parent document list preparing unit 7 according to a following procedure. A plurality of document information entry spaces DS1 to DS3 of which the number is equal to the number of collected reference documents are prepared. In each of the document information entry spaces, the number of one hypertext document identifier identifying one collected reference document and one document storing position address of the collected reference document are written in the document information entry space. Thereafter, a title of the collected reference document is extracted from the collected reference document by examining a plurality of character strings written in the collected reference document. In this embodiment, a title "apple that I grew" is, for example, extracted from a character string "<title> apple that I grew <title>", and the title is written in the document information entry space. Thereafter, one or more character strings of hypertext mark-up language tags respectively denoting a character string placed between "<" and ">" are removed from a plurality of character strings existing in a body of the collected reference document to form a text body, and the text body is written in the document information entry space. Thereafter, it is checked whether or not one or more anchor sentences relating to one reference document exist in one or more parent documents relating to the reference document. In cases where an anchor sentence exists in an parent document relating to one reference document, a set of an parent document identifier identifying the parent document and the anchor sentence of the parent document is written in the document information entry space to form an parent document list for each hypertext document information. Also, a plurality of words used in the text body, the title and the anchor sentences are written in the document information entry space to form a word list for each hypertext document information.

Therefore, in the reference document table with parent document preparing unit 7, as shown in FIG. 3, a document information entry space is prepared for each of the hypertext documents managed by the hypertext document managing unit 8, a hypertext document identifier, a document storing position, a title, a text body, an parent document list and a word list are written in each of the document information entry spaces to prepare a hypertext document table.

In this embodiment, the hypertext document table is prepared after one or more anchor sentences written in each of the parent documents are analyzed to collect the reference documents. Therefore, the anchor sentences are analyzed or checked twice to determine the collected reference documents and prepare the hypertext document table. However, in cases where the hypertext document table is prepared while analyzing the anchor sentences to collect the reference documents, the hypertext document table can be efficiently prepared. Thereafter, in the retrieval index preparing unit 6 having a dictionary, a body of a hypertext document, a title of the hypertext document and character strings of one or more anchor sentences of the hypertext document are analyzed in advance for each of the hypertext documents of the hypertext document table, a piece of word information composed of a word, one or more occurrence document identifiers identifying hypertext documents, in which the word appears, and positional information indicating occurrence positions of the word in the hypertext documents is prepared for each of a plurality of words stored in the dictionary, and a retrieval index of pieces of word information for the plurality of words is prepared as shown in FIG. 5.

In detail, tens of thousands words are registered in the dictionary of the retrieval index preparing unit 6, and a plurality of word information entry spaces WS1 to WS3, of which the number is equal to the number of words registered in the dictionary, are prepared, and each of the words is written in one of the word information entry spaces WS1 to WS3. Thereafter, a word registered in the word list of one document information entry space of the hypertext document table is detected as a particular word, a hypertext document identifier of a particular hypertext document corresponding to the document information entry space is detected as an occurrence hypertext document identifier, one or more positions of the particular word in the particular hypertext document are detected as positional information, and a set of the occurrence hypertext document identifier and the positional information is written as word information in a particular word information entry space corresponding to the particular word. This processing is performed for each of the words registered in the word lists of all document information entry spaces of the hypertext document table, so that a retrieval index of the pieces of word information corresponding to a plurality of words used in the hypertext documents is prepared.

Figures 5, 6:
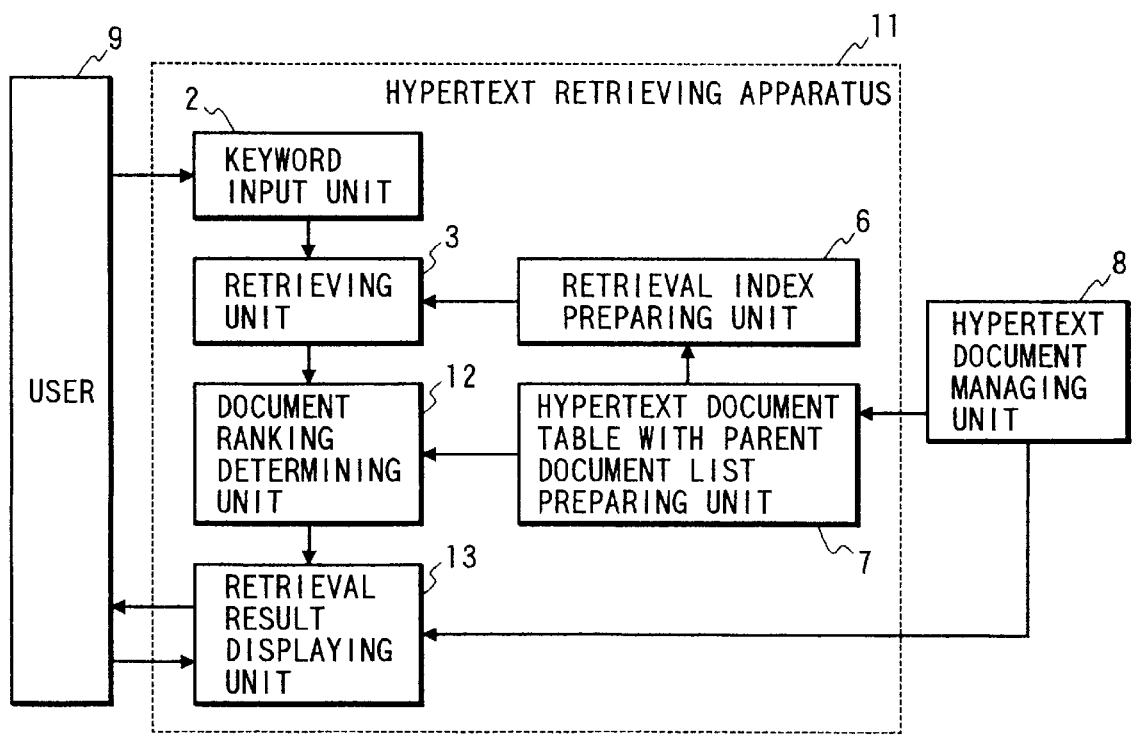
FIG. 5 shows a retrieval index of pieces of word information prepared in a retrieval index preparing unit shown in FIG. 3.
FIG. 6 is a block diagram of a hypertext retrieving apparatus according to a second embodiment of the present invention.

FIG. 5 shows a piece of word information of the retrieval index which is written in the word information entry space WS1 and corresponds to a word "apple". "(Title,1)" indicates that the word "apple" appears in the first word position of the title of the hypertext document D83, "(Body,4,33,43)" indicates that the word "apple" appears in the fourth, 33-th and 43-th word positions of the body of the hypertext document D83, "(000081,1)" indicates that the word "apple" appears in the first word position of the anchor sentence S801 of the hypertext document D81 functioning as the parent document, and "(000082,4)" indicates that the word "apple" appears in the fourth word position of the anchor sentence S802 of the hypertext document D82 functioning as the parent document.

Also, it is applicable that an inverse value of the number of occurrence documents in which a word appears (generally called an inverse document frequency IDF) and the occurrence frequency of the word in each of the occurrence documents (generally called a text frequency TF) be calculated in advance in the retrieval index preparing unit 6 and written in a corresponding word information entry space for each of the words. Therefore, a processing time required for the retrieval can be shortened.

Therefore, in the retrieval index preparing unit 6, each of the words appearing in the text body of the hypertext document, the title of the hypertext document and the anchor sentences of the parent documents relating to the hypertext document is analyzed, and an occurrence document list composed of one or more occurrence document identifiers and the positional information is prepared for each word. Accordingly, a retrieval index in which word appearing positions in each of the hypertext documents are indicated for each word can be prepared.

The keyword input unit 2 has a function of a text box and a retrieval starting button for returning contents of the text box, and an HTML document written according to the hypertext mark-up language having a title such as "retrieval page" is employed for the keyword input unit 2. That is, the user 9 calls the HTML document in the world wide web browser such as Mosaic or Netscape operated in his own client computer, a single keyword is input to the text box or a plurality of keywords divided by spaces are input to the text box, and the retrieval starting button is pushed. Therefore, the single keyword or keywords are input.

Therefore, a plurality of keywords input by the user 9 are received in the keyword input unit 2 and are transmitted to the retrieving unit 3. In this embodiment, the user inputs each of the keywords by pushing a plurality of keys arranged on a keyboard. However, in cases where each of a plurality of candidates for a keyword is selected by pushing a button, a keyword input operation using the pointing device can be easily performed without using any keyboard even though an unskilled person operates the keyword input unit 2.

In the retrieving unit 3, pieces of particular word information corresponding to a plurality of particular words, which agree with the keywords input by the keyword input unit 2, are extracted from the retrieval index stored in the retrieval index preparing unit 6, and one or more occurrence document identifiers identifying one or more particular hypertext documents, in which one particular word agreeing with one keyword appears, and positional information indicating positions of the particular word in the particular hypertext documents are obtained from one piece of word information for each of the particular words. A plurality of sets of the occurrence document identifiers and the positional information are transmitted to the document ranking determining unit 4.

In the document ranking determining unit 4, pieces of hypertext document information corresponding to the particular hypertext documents identified by the occurrence document identifiers are extracted from the hypertext document table, and one particular hypertext document and one or more parent documents identified by one or more parent document identifiers listed in one piece of hypertext document information corresponding to the particular hypertext document are unified to an unified particular hypertext document. The unified particular hypertext document is formed for each of the particular hypertext documents which are identified by the occurrence document identifiers transmitted from the retrieving unit 3. Thereafter, an inverse document frequency IDF defined as an inverse value of the number of unified particular hypertext documents in which one particular word agreeing with one keyword appears and the occurrence frequency TF of one particular word in each of the unified particular hypertext documents are calculated for each of the particular words according to the plurality of sets of the occurrence document identifiers and the positional information. The inverse document frequency IDF denotes a correction factor for each particular word.

Thereafter, in cases where one keyword is only input, an estimated value obtained by multiplying the inverse document frequency IDF for one particular word and the occurrence frequency TF together is calculated as an importance degree for each of the unified particular hypertext documents. Also, in cases where the number of keywords input by the user is two or more, a product TF*IDF of one occurrence frequency TF and one inverse document frequency IDF is calculated for each keyword and each unified particular hypertext document, a sum of the products calculated for all keywords is adopted as an estimated value for each of the unified particular hypertext documents, and an importance degree for each of the unified particular hypertext documents is determined according to the estimated values. The importance degree for each unified particular hypertext document is set as an importance degree for one particular hypertext document corresponding to the unified particular hypertext document. Thereafter, the ranking of the particular hypertext documents including the parent documents is determined according to the importance degrees of the particular hypertext documents.

In cases where the number of keywords is two or more, it is applicable that an estimated value for one particular hypertext document be set to a value N times (N is two or more) as high as a sum of the products TF*IDF calculated for all keywords when N particular words agreeing with N keywords appear in the particular hypertext document. In this case, because the correlation among the N keywords is reflected on the importance degree for each particular hypertext document, the user's retrieval request can be moreover satisfied.

Also, in cases where two particular words agreeing with two keywords are used in one particular hypertext document close to each other within 20 characters, it is applicable that an estimated value for the unified particular hypertext document be doubled. In this case, because the correlation between the two keywords close to each other is reflected on the importance degree for each particular hypertext document, the user's retrieval request can be moreover satisfied.

Thereafter, in the document ranking determining unit 4, an HTML document, in which a plurality of indexes of the particular hypertext documents are listed in the ranked order, is prepared and transmitted to the retrieval result displaying unit 5. In this case, the index of one particular hypertext document is a title of the particular hypertext document or a character string of an anchor sentence written in one of the parent documents, and a document storing position address indicating a position of the particular hypertext document in the hypertext document managing unit 8 is buried in the index of the particular hypertext document, and the index functions as an anchor sentence. That is, when the user selects one index of one particular hypertext document, the particular hypertext document is called from the hypertext document managing unit 8 according to the document storing position address.

Therefore, in the document ranking determining unit 4, one or more parent documents having a reference relationship with one particular hypertext document are extracted from the hypertext document table prepared in the reference document table with parent document preparing unit 7 for each particular hypertext document, one particular hypertext document and one or more parent documents having a reference relationship with the particular hypertext document are unified to a unified particular hypertext document for each particular hypertext document, an importance degree of the particular hypertext document including the parent documents is determined according to an estimated value TF*IDFN for each particular hypertext document, the particular hypertext documents are ranked according to the those importance degrees, and the particular hypertext documents are listed in the ranked order.

In this embodiment, the occurrence frequency TF of the word is not normalized because the occurrence frequency TF is not divided by a size of one unified particular hypertext document. However, in cases where the occurrence frequency TF of the word is normalized by dividing the occurrence frequency TF by a size of one unified particular hypertext document, it is required that a size of each hypertext document is written in the hypertext document table.

The retrieval result displaying unit 5 is embodied by the world wide web browser such as Mosaic or Netscape operated in his own client computer. The HTML document prepared in the document ranking determining unit 4 is displayed on a display of the client computer. Thereafter, when the user selects one index of one particular hypertext document tabled in the HTML document by using a pointing device, a position of the particular hypertext document selected by the user is ascertained according to the document storing position address buried in the index of the particular hypertext document, and the particular hypertext document is called from the hypertext document managing unit 8.

Therefore, in the retrieval result displaying unit 5, the indexes of the particular hypertext documents listed in the HTML document are displayed, the user selects one index of one particular hypertext document, and the particular hypertext document selected by the user is called from the hypertext document managing unit 8.

Accordingly, because one or more parent documents having a reference relationship with each reference document are listed in the hypertext document table prepared by the reference document table with parent document preparing unit 7, the parent documents corresponding to one reference document can be specified by extracting the document information corresponding to the reference document from the hypertext document table. Therefore, because it is not required to ask the hypertext document managing unit 8 for one or more parent documents corresponding to the reference document, one or more parent documents corresponding to each reference document can be quickly ascertained.

Also, because one particular hypertext document and one or more parent documents having a reference relationship with the particular hypertext document are unified as an unified particular hypertext document in the document ranking determining unit 4, an importance degree can be determined for each of the unified particular hypertext documents. Therefore, the ranking of the particular hypertext documents in which one particular word agreeing with one keyword appears can be determined according to the importance degrees while considering the parent documents corresponding to each particular hypertext document. Accordingly, the indexes of the particular hypertext documents can be displayed by the retrieval result displaying unit 5 according to the ranking of the particular hypertext documents on condition that the user's retrieval request expressed by the keyword is reliably satisfied, and the user can selects the particular hypertext documents in the ranked order.

Also, because one hypertext document and one or more anchor sentences of one or more parent documents having a reference relationship with the hypertext document are listed in each piece of document information of the hypertext document table prepared by the reference document table with parent document preparing unit 7, each piece of word information of the retrieval index indicating that a word appears in one hypertext document and one or more anchor sentences of one or more parent documents having a reference relationship with the hypertext document can be easily prepared in the retrieval index preparing unit 6. In addition, because one or more parent documents having a reference relationship with each reference document are listed in the hypertext document table prepared by the reference document table with parent document preparing unit 7, when the retrieval index is prepared in the retrieval index preparing unit 6, it is not required to ask the hypertext document managing unit 8 for one or more parent documents corresponding to the reference document. Therefore, the retrieval index can be quickly prepared.

(Second Embodiment)

FIG. 6 is a block diagram of a hypertext retrieving apparatus according to a second embodiment of the present invention.

As shown in FIG. 6, a hypertext retrieving apparatus 11 for retrieving one or more hypertext documents likely to meet a user's retrieval request from a large volume of hypertext documents stored in the hypertext document managing unit 8, comprises the hypertext document table with parent document list preparing unit 7, the retrieval index preparing unit 6, the keyword input unit 2, the retrieving unit 3, a document ranking determining unit 12 for unifying one particular hypertext document and one or more particular parent documents corresponding to the particular hypertext document to a unified particular hypertext document according to the document information of the hypertext document table prepared by the hypertext document table with parent document list preparing unit 7 for each of the particular hypertext documents obtained in the retrieving unit 3, calculating estimated values for the unified particular hypertext documents according to the particular word information of the retrieval index obtained in the retrieval index preparing unit 6, determining a plurality of importance degrees of the unified particular hypertext documents according to the estimated values, determining the ranking of the particular hypertext documents according to the importance degrees for the unified particular hypertext documents and preparing an index of one particular hypertext document with an index of a particular parent document corresponding to the particular hypertext document for each of the particular hypertext documents, and a retrieval result displaying unit 13 for displaying the index of the particular hypertext document with the index of the particular parent document for each of the unified particular hypertext documents in the ranked order determined in the document ranking determining unit 12 as a retrieval result.

In the above configuration, after the ranking of the particular hypertext documents is determined according to the importance degrees in the document ranking determining unit 12 in the same manner as in the first embodiment, not only an index of one particular hypertext document but also an index of a particular parent document corresponding to the particular hypertext document are prepared for each of the particular hypertext documents. In cases where a plurality of parent documents corresponding to the particular hypertext document exist, one parent document of which the document storing position is closest to that of the particular hypertext document among those of the parent documents is selected as the particular parent document. This selection is performed by comparing a portion of a character string indicating the document storing position of each parent document with a portion of a character string indicating the document storing position of the particular hypertext document. Also, in this embodiment, the particular parent document (or a first-stage particular parent document) is regarded as a second-stage reference document, a second-stage particular parent document having a reference relationship with the second-stage reference document is specified, and an index of the second-stage particular parent document is prepared. Thereafter, the index of one particular hypertext document is displayed with the index of the first-stage particular parent document and the index of the second-stage particular parent document for each particular hypertext document by the retrieval result displaying unit 13.

FIG. 7 shows an example of the index of one particular hypertext document displayed with the index of the first-stage particular parent document and the index of the second-stage particular parent document for each particular hypertext document by the retrieval result displaying unit 13.

As shown in FIG. 7, in cases where the fourth rank is given to the hypertext document D83, the 18-th rank is given to the hypertext document D85 and the 19-th rank is given to the hypertext document D86, the index of the particular hypertext document D83 is displayed with the index of the first-stage particular parent document D81 and the index of the second-stage particular parent document D80 as a fourth ranking group, the index of the particular hypertext document D85 is displayed with the index of the first-stage particular parent document D83 and the index of the second-stage particular parent document D81 as a 18-th ranking group, and the index of the particular hypertext document D86 is displayed with the index of the first-stage particular parent document D83 and the index of the second-stage particular parent document D81 as a 19-th ranking group.

Accordingly, even though the hypertext document D86 having no anchor sentence is selected as one particular hypertext document, the hypertext document D83 or D81 having a close relation with the hypertext document D86 can be easily selected and called from the hypertext document managing unit 8 without relying on any anchor sentence. That is, because a plurality of hypertext documents having a reference relationship with each other closely relate to each other, the display of the indexes of the first-stage and second-stage particular parent document is very useful for the user.

(Third Embodiment)

In the first or second embodiment, in cases where the hypertext document D83 of the fourth rank is called and read, the hypertext document D85 is called and read by selecting the position of the anchor sentence S804 and a plurality of hypertext documents of lower ranks following the fourth rank are called and read one by one, there is a probability that the hypertext document D85 of the 18-th rank is erroneously called and read again because the user forgets the reading of the hypertext document D85 though the hypertext document D85 has been already read. Also, even though the hypertext document D86 of the 19-th rank is called and read, because a long time elapses after the hypertext document D83 of the fourth rank is called and read, there is a probability that the user cannot understand context of the hypertext document D86 closely relating to context of the hypertext document D83. Therefore, to solve the above drawbacks in the third embodiment, the ranks given to a plurality of hypertext documents closely relating to each other are set to the same rank.

Figure 8:
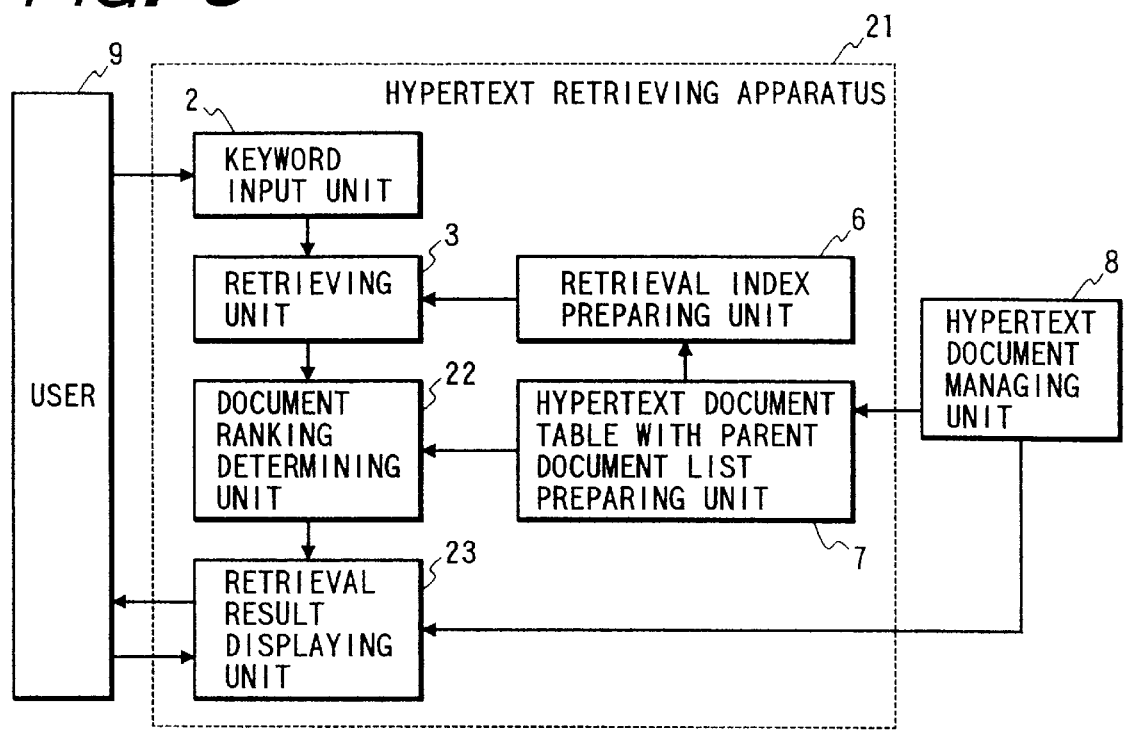
FIG. 8 is a block diagram of a hypertext retrieving apparatus according to a third embodiment of the present invention.

FIG. 8 is a block diagram of a hypertext retrieving apparatus according to a third embodiment of the present invention.

As shown in FIG. 8, a hypertext retrieving apparatus 21 for retrieving one or more hypertext documents likely to meet a user's retrieval request from a large volume of hypertext documents stored in the hypertext document managing unit 8, comprises the hypertext document table with parent document list preparing unit 7, the retrieval index preparing unit 6, the keyword input unit 2, the retrieving unit 3, a document ranking determining unit 22 for unifying one particular hypertext document and one or more particular parent documents corresponding to the particular hypertext document to a unified particular hypertext document according to the document information of the hypertext document table prepared by the hypertext document table with parent document list preparing unit 7 for each of the particular hypertext documents obtained in the retrieving unit 3, calculating estimated values for the unified particular hypertext documents according to the particular word information of the retrieval index obtained in the retrieval index preparing unit 6, determining a plurality of importance degrees of the unified particular hypertext documents according to the estimated values, determining the ranking of the particular hypertext documents according to the importance degrees for the unified particular hypertext documents on condition that ranks given to two or more particular hypertext documents closely relating to each other are set to the same rank and preparing an index of one particular hypertext document for each of the particular hypertext documents, and a retrieval result displaying unit 23 for displaying the indexes of the particular hypertext documents in the ranked order determined in the document ranking determining unit 22 as a retrieval result on condition that two or more particular hypertext documents set to the same rank are displayed with one or more particular parent documents corresponding to any of the particular hypertext documents in common in a group.

In the above configuration, after the importance degrees of the particular hypertext documents are calculated and the ranking of the particular hypertext documents is determined according to the importance degrees in the document ranking determining unit 22 in the same manner as in the first embodiment, one or more parent document identifiers listed in one piece of document information of the hypertext document table corresponding to one particular hypertext document are extracted, and one or more parent documents identified by the parent document identifiers are specified for each particular hypertext document. Thereafter, it is judged whether or not each of the parent documents agrees with one of the particular hypertext documents. In cases where one parent document corresponding to a first particular hypertext document of a rank A agrees with a second particular hypertext document of a rank B, it is judged that the first and second particular hypertext documents closely relate to each other, and the first and second particular hypertext documents are reset to a higher rank between the ranks A and B. Thereafter, indexes of the particular hypertext documents are displayed in the ranked order by the retrieval result displaying unit 23.

For example, because the parent document D83 corresponding to the hypertext document D85 of the 18-th rank agrees with the hypertext document D83 of the fourth rank, the hypertext document D85 is reset to the fourth rank. Also, because the parent document D83 corresponding to the hypertext document D86 of the 19-th rank agrees with the hypertext document D83 of the fourth rank, the hypertext document D86 is reset to the fourth rank.

Therefore, because a plurality of particular hypertext documents closely relate to each other are set to the same rank and are displayed close to each other, the user can consecutively read the particular hypertext documents closely relate to each other, so that the user can easily realize the contexts of the particular hypertext documents. Accordingly, it is prevented that the same particular hypertext document is erroneously read again, and the user can efficiently read a group of particular hypertext documents closely relate to each other.

In this embodiment, a plurality of particular hypertext documents closely relate to each other are set to the highest rank among the ranks given to the plurality of particular hypertext documents. However, the third embodiment is not limited to this concept. That is, when a plurality of particular hypertext documents closely relate to each other are determined, it is applicable that a sum of the importance degrees of the particular hypertext documents be calculated and the particular hypertext documents be reset to the same higher rank according to the summed importance degree.

Figure 9:
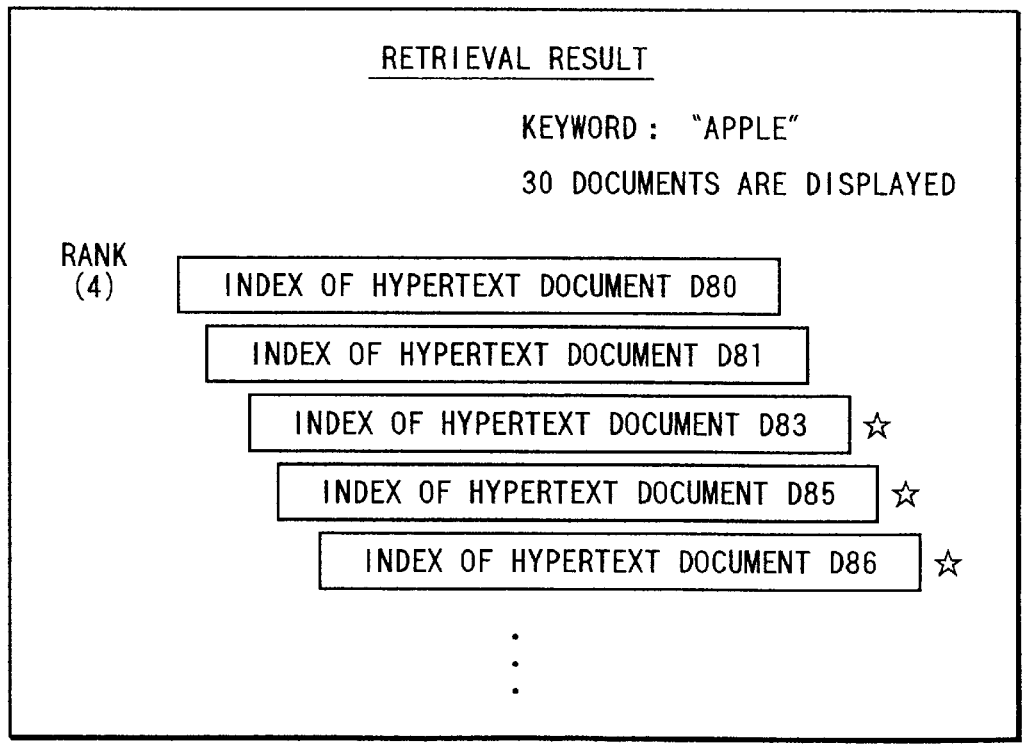
FIG. 9 shows an example of a retrieval result in which indexes of a plurality of particular hypertext documents are displayed with an index of a first-stage particular parent document and an index of a second-stage particular parent document by a retrieval result displaying unit shown in FIG. 8.

Also, it is preferred that the concept of the second embodiment and the concept of the third embodiment be combined. For example, as shown in FIG. 7, when a first group of the particular hypertext document D83 and the parent documents D80 and D81 is set to the fourth rank, a second group of the particular hypertext document D85 and the parent documents D81 and D83 is set to the 18-th rank and a third group of the particular hypertext document D86 and the parent documents D81 and D83 is set to the 19-th rank according to the second embodiment, the second group of documents D81, D83 and D85 set to the 18-th rank is reset to the fourth rank, and the third group of documents D81, D83 and D86 set to the 19-th rank is reset to the fourth rank, and a combined group of the particular hypertext documents D83, D85 and D86 and the parent documents D80 and D81 reset to the fourth rank is displayed as shown in FIG. 9.

(Fourth Embodiment)

In general, a special word indicating a feature of a reference document appears many times in one or more anchor sentences of one or more parent documents corresponding to the reference document. Therefore, in cases where an estimated value for the reference document is calculating by considering the special word appearing in the anchor sentences of the parent document and the reference document is ranked according to the estimated value, reliability for the retrieval of a plurality of hypertext documents likely to meet a user's retrieval request can be improved.

Figure 10:
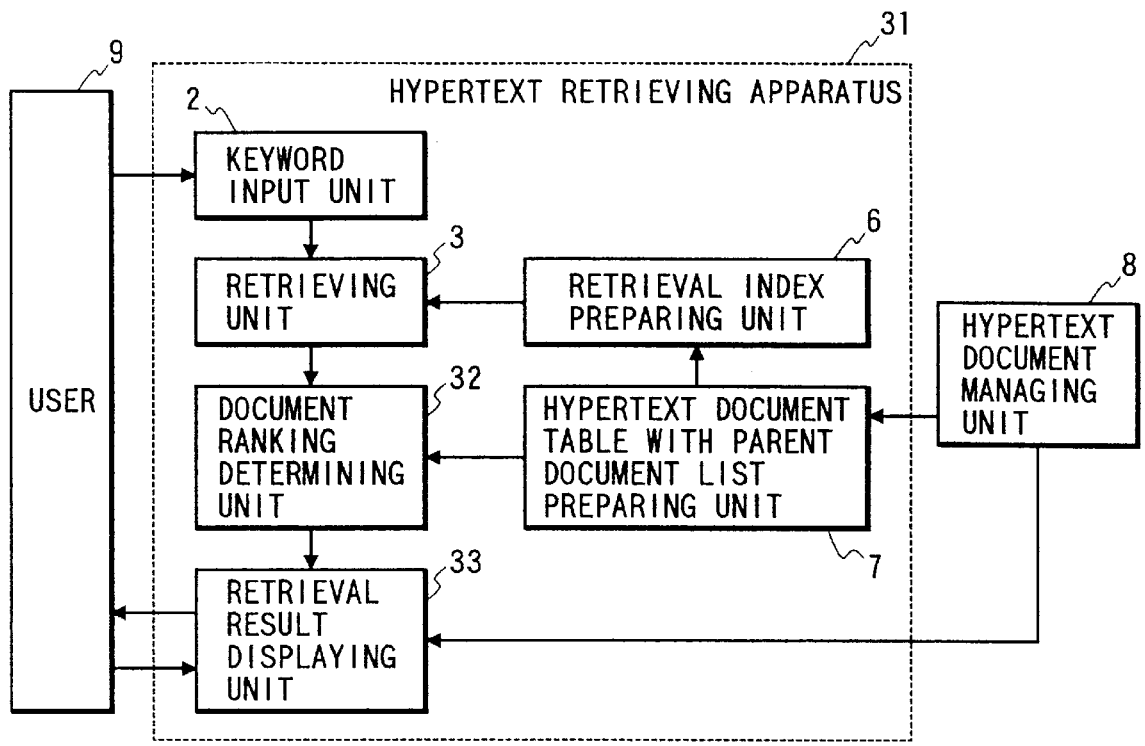
FIG. 10 is a block diagram of a hypertext retrieving apparatus according to a fourth embodiment of the present invention.

FIG. 10 is a block diagram of a hypertext retrieving apparatus according to a fourth embodiment of the present invention.

As shown in FIG. 10, a hypertext retrieving apparatus 31 for retrieving one or more hypertext documents likely to meet a user's retrieval request from a large volume of hypertext documents stored in the hypertext document managing unit 8, comprises the hypertext document table with parent document list preparing unit 7, the retrieval index preparing unit 6, the keyword input unit 2, the retrieving unit 3, a document ranking determining unit 32 for calculating an occurrence frequency of each particular word in one particular hypertext document and one or more anchor sentences of one or more particular parent documents corresponding to the particular hypertext document as a revised occurrence frequency TF for the particular hypertext document for each of the particular hypertext documents according to the particular word information of the retrieval index obtained in the retrieval index preparing unit 6, calculating estimated values of the particular hypertext documents according to the revised occurrence frequencies TF and inverse document frequencies IDF, determining a plurality of importance degrees of the particular hypertext documents according to the estimated values, determining the ranking of the particular hypertext documents according to the importance degrees and preparing indexes of the particular hypertext documents, and a retrieval result displaying unit 33 for displaying the indexes of the particular hypertext documents in the ranked order determined in the document ranking determining unit 22 as a retrieval result.

Figure 4:
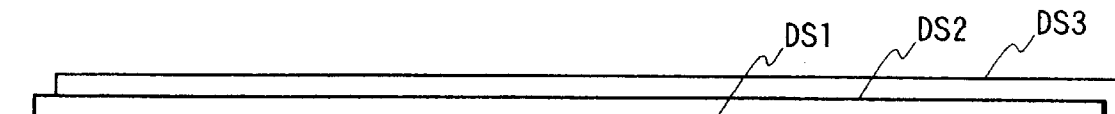
FIG. 4 shows a hypertext document table of pieces of hypertext document information prepared in a hypertext document table with parent document list preparing unit shown in FIG. 3.

In the above configuration, in cases where the user input a keyword "apple", as shown in FIG. 4, the particular word "apple " appears four times in the title of the hypertext document D83 and the body of the hypertext document D83. Also, the particular word "apple " appears in the anchor sentence S801 of the parent document D81 and the anchor sentence S802 of the parent document D82. Therefore, because a sum of an occurrence frequency of the particular word "apple " in the hypertext document D83 and the anchor sentences S801 and S802 of the parent documents D81 and D82 is 6, a revised occurrence frequency TF for the particular hypertext document D83 is set to 6, and an estimated value of the particular hypertext document D83 is calculated by using the revised occurrence frequency TF in the document ranking determining unit 32. Accordingly, the particular hypertext document D83 is ranked to a higher rank, so that reliability of the retrieval of the particular hypertext document D83 can be improved.

(Fifth Embodiment)

In the first to fourth embodiments, in cases where the user desires to know an outline of contents of one particular hypertext document when an index of the particular hypertext document is displayed, it is required to call the particular hypertext document from the hypertext document managing unit 8. Therefore, in cases where the user desires to read contents of many particular hypertext documents, it is troublesome that the user call the particular hypertext documents.

Figure 11:
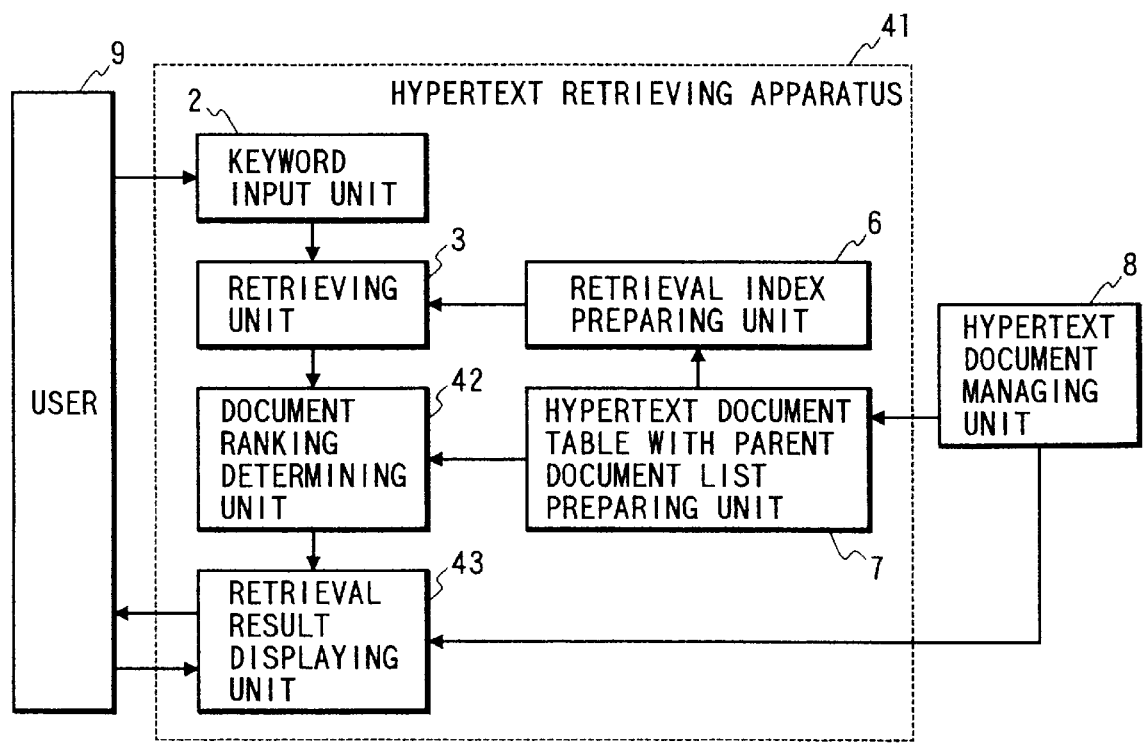
FIG. 11 is a block diagram of a hypertext retrieving apparatus according to a fifth embodiment of the present invention.

FIG. 11 is a block diagram of a hypertext retrieving apparatus according to a fifth embodiment of the present invention.

As shown in FIG. 11, a hypertext retrieving apparatus 41 for retrieving one or more hypertext documents likely to meet a user's retrieval request from a large volume of hypertext documents stored in the hypertext document managing unit 8, comprises the hypertext document table with parent document list preparing unit 7, the retrieval index preparing unit 6, the keyword input unit 2, the retrieving unit 3, a document ranking determining unit 42 for unifying one particular hypertext document and one or more particular parent documents corresponding to the particular hypertext document to a unified particular hypertext document according to the document information of the hypertext document table prepared by the hypertext document table with parent document list preparing unit 7 for each of the particular hypertext documents obtained in the retrieving unit 3, calculating estimated values for the unified particular hypertext documents for each particular word according to the particular word information of the retrieval index obtained in the retrieval index preparing unit 6, determining a plurality of importance degrees of the unified particular hypertext documents according to the estimated values for each particular word, determining the ranking of the particular hypertext documents according to the importance degrees for the unified particular hypertext documents for each particular word, preparing an index of one particular hypertext document for each of the particular hypertext documents and preparing a plurality of summaries of the particular hypertext documents for each of the particular words, and a retrieval result displaying unit 43 for displaying a group of the indexes of the particular hypertext documents with the summaries of the particular hypertext documents in the ranked order determined in the document ranking determining unit 42 for each particular word as a retrieval result.

In the above configuration, after the indexes of the particular hypertext documents are prepared in the document ranking determining unit 42, a particular sentence or a particular phrase including one particular word is extracted from one particular hypertext document according to the positional information of the word information of the retrieval index prepared by the retrieval index preparing unit 6, and a summary in which the particular sentence or the particular phrase is written in succession to a top sentence or a top phrase of the particular hypertext document is prepared for each of the particular words and each of the particular hypertext documents. In cases where a plurality of particular sentences or a plurality of particular phrases including one particular word exist in one particular hypertext document, a summary in which the particular sentences or the particular phrases arranged in the existing order are written in succession to a top sentence or a top phrase of the particular hypertext document is prepared. Thereafter, the indexes of the particular hypertext documents with the summaries of the particular hypertext documents are displayed for each particular word by the retrieval result displaying unit 43 in the ranked order determined in the document ranking determining unit 42.

Accordingly, because the summary of one particular hypertext document is displayed for each of the particular hypertext documents, the user can realize an outline of contents of each particular hypertext document by reading the summary of each particular hypertext document without calling each particular hypertext document from the hypertext document managing unit 8, the user can easily select one or more particular hypertext documents meeting a user's retrieval request.

In this embodiment, even though a particular sentence or a particular phrase including one particular word appears many times in one particular hypertext document, all particular sentences or all particular phrases including the particular word are extracted from the particular hypertext document, and a summary is prepared. However, in cases where a summary of one particular hypertext document obtained by connecting a series of particular sentences or a series of particular phrases of the particular hypertext document with a top sentence or a top phrase of the particular hypertext document becomes too long, it is difficult for the user to quickly realize a long summary. Therefore, it is applicable that three particular sentences or three particular phrases of the particular hypertext document be connected with a top sentence or a top phrase of the particular hypertext document to prepare a summary for each particular word when the number of keywords input by the user is five or less, two particular sentences or two particular phrases of the particular hypertext document be connected with a top sentence or a top phrase of the particular hypertext document to prepare a summary for each particular word when the number of keywords input by the user is ten or less, or one particular sentence or one particular phrase of the particular hypertext document be connected with a top sentence or a top phrase of the particular hypertext document to prepare a summary for each particular word when the number of keywords input by the user is eleven or more. Therefore, it is prevented that the summary becomes too long, and the user can efficiently read a number of summaries displayed by the retrieval result displaying unit 43.

Also, it is preferred that the concept of the second embodiment and the concept of the fifth embodiment be combined. For example, when a first group of the particular hypertext document D83 and the parent documents D80 and D81 is set to the fourth rank, a second group of the particular hypertext document D85 and the parent documents D81 and D83 is set to the 18-th rank and a third group of the particular hypertext document D86 and the parent documents D81 and D83 is set to the 19-th rank according to the second embodiment, as shown in FIG. 12, a summary of the particular hypertext document D83 is added to the first group, a summary of the particular hypertext document D85 is added to the second group and a summary of the particular hypertext document D86 is added to the third group.

(Sixth Embodiment)

In the world wide web, a composition (or an article) is divided into a number of portions, and each portion of the composition is written in one hypertext document. Therefore, there is a case that a context of the composition is not sufficiently expressed in one portion of the composition written in one hypertext document. For example, though an apple grown in Aomori is described in the composition, the word "Aomori" indicating a production place of the apple is not written in the hypertext document D83 but is written in the parent document D81.

Therefore, in cases where a plurality of keywords expressing a context of a composition are separately used in a hypertext document and a plurality of parent documents having a reference relationship with the hypertext document, the hypertext document is undesirably ranked to a lower class in the prior art. However, in the sixth embodiment, one combined hypertext document produced by combining a retrieval hypertext document (or a particular hypertext document) and one parent document having a reference relationship with the retrieval hypertext document is prepared for each of the parent documents, importance degrees of the combined hypertext documents are compared with each other, one combined hypertext document having the maximum importance degree is selected, and the maximum importance degree is used as an importance degree for the retrieval hypertext document.

Figure 13:
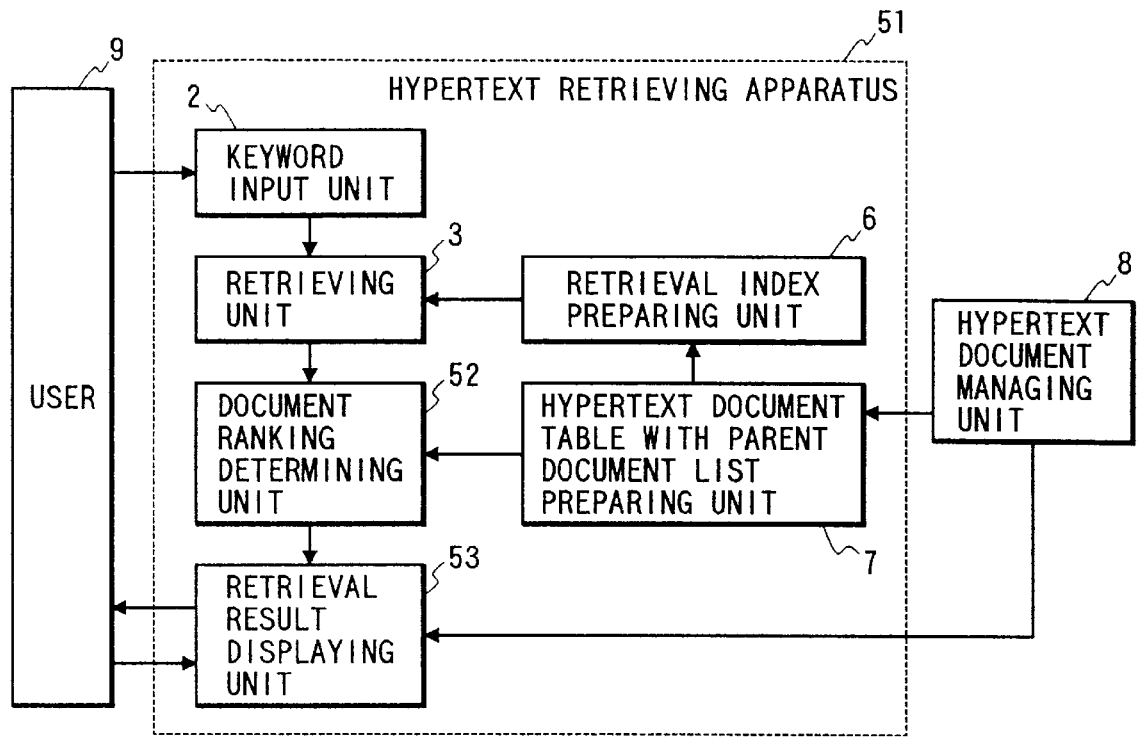
FIG. 13 is a block diagram of a hypertext retrieving apparatus according to a sixth embodiment of the present invention.

FIG. 13 is a block diagram of a hypertext retrieving apparatus according to a sixth embodiment of the present invention.

As shown in FIG. 13, a hypertext retrieving apparatus 51 for retrieving one or more hypertext documents likely to meet a user's retrieval request from a large volume of hypertext documents stored in the hypertext document managing unit 8, comprises the hypertext document table with parent document list preparing unit 7, the retrieval index preparing unit 6, the keyword input unit 2, the retrieving unit 3, a document ranking determining unit 52 for combining one particular hypertext document and one particular parent document corresponding to the particular hypertext document to form a combined particular hypertext document according to the document information of the hypertext document table prepared by the hypertext document table with parent document list preparing unit 7 for each of the particular parent documents corresponding to the particular hypertext document and each of the particular hypertext documents obtained in the retrieving unit 3, calculating estimated values for the combined particular hypertext documents according to the particular word information of the retrieval index obtained in the retrieval index preparing unit 6 for each of the particular hypertext documents, determining a plurality of importance degrees of the combined particular hypertext documents according to the estimated values for each of the particular hypertext documents, comparing the importance degrees of the combined particular hypertext documents with each other for each of the particular hypertext documents, selecting a maximum importance degree among the importance degrees of the combined particular hypertext documents relating to one particular hypertext document for each of the particular hypertext documents, setting the maximum importance degree to an importance degree for the particular hypertext document for each of the particular hypertext documents, determining the ranking of the particular hypertext documents according to those importance degrees and preparing an index of one particular hypertext document for each of the particular hypertext documents, and a retrieval result displaying unit 53 for displaying a group of the indexes of the particular hypertext documents with the summaries of the particular hypertext documents in the ranked order determined in the document ranking determining unit 52 for each particular word as a retrieval result.

In the above configuration, when a keyword "apple" and another keyword "Aomori" are input by the user on condition that a word "apple" appears in the hypertext document D83 and a word "Aomori" indicating an apple-producing prefecture does not appear in the hypertext document D83 or D82 but appear in the hypertext document D81, because a particular word "apple" agreeing with the keyword "apple " appears in the hypertext document D83, the hypertext document D83 is set as a particular hypertext document in the retrieving unit 3.

Thereafter, in the document ranking determining unit 52, the particular hypertext document D83 and the particular parent document D81 are combined to form a first combined particular hypertext document, the particular hypertext document D83 and the particular parent document D82 are combined to form a second combined particular hypertext document, estimated values for the combined particular hypertext documents are calculated for each of the particular words, a first sum of the estimated value of the first combined particular hypertext document for the particular words and a second sum of the estimated value of the second combined particular hypertext document for the particular words are calculated. In this case, because the particular word "Aomori" does not appear in the hypertext document D82 but appear in the hypertext document D81, the first sum of the estimated value of the first combined particular hypertext document is higher than the second sum of the estimated value of the second combined particular hypertext document.

Therefore, the first combined particular hypertext document is selected, and the first sum of the estimated value of the first combined particular hypertext document is set as an estimated value of the particular hypertext document D83 for the keywords "apple " and "Aomori", and an importance degree for the particular hypertext document D83 is calculated from the estimated value of the particular hypertext document D83. In the same manner, importance degrees for other particular hypertext documents are calculated, and the ranking of the particular hypertext documents is determined according to the importance degrees.

Accordingly, even though a plurality of keywords expressing a context of a composition are separately used in a hypertext document and a plurality of parent documents having a reference relationship with the hypertext document, because a combined particular hypertext document obtained by combining one particular hypertext document and one particular parent document is formed for each of the particular parent documents and a maximum estimated value of one combined particular hypertext document among those of the combined particular hypertext documents is set as an estimated value for the particular hypertext document, there is no probability that the particular hypertext document is undesirably ranked to a lower class.

(Seventh Embodiment)

A heading portion of a hypertext document normally indicates a feature of the hypertext document very well. Therefore, to heavily estimate a particular word appearing in the heading portion of the hypertext document, an occurrence frequency of the particular word agreeing with one keyword in the heading portion of the hypertext document is doubled. As an example of the heading portion, a title of the hypertext document or an anchor sentence of a parent document having a reference relationship with the hypertext document is considered in this embodiment.

Figure 14:
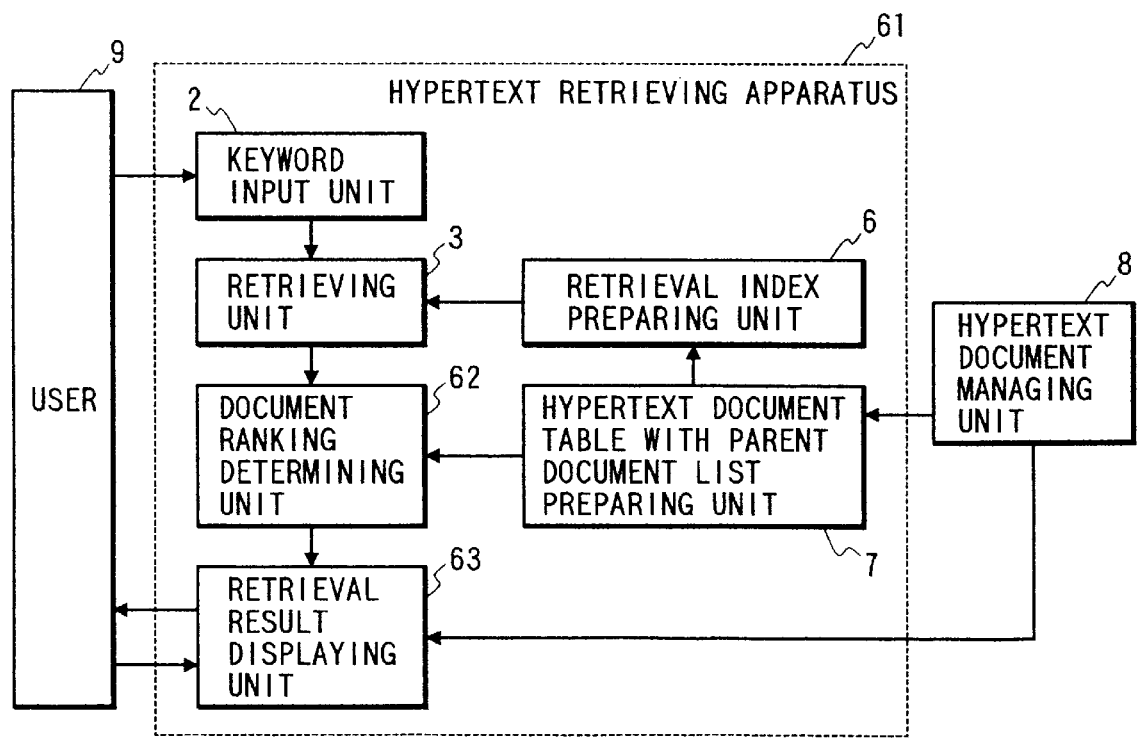
FIG. 14 is a block diagram of a hypertext retrieving apparatus according to a seventh embodiment of the present invention.

FIG. 14 is a block diagram of a hypertext retrieving apparatus according to a seventh embodiment of the present invention.

As shown in FIG. 14, a hypertext retrieving apparatus 61 for retrieving one or more hypertext documents likely to meet a user's retrieval request from a large volume of hypertext documents stored in the hypertext document managing unit 8, comprises the hypertext document table with parent document list preparing unit 7, the retrieval index preparing unit 6, the keyword input unit 2, the retrieving unit 3, a document ranking determining unit 62 for unifying one particular hypertext document and one or more particular parent documents corresponding to the particular hypertext document to a unified particular hypertext document according to the document information of the hypertext document table prepared by the hypertext document table with parent document list preparing unit 7 for each of the particular hypertext documents obtained in the retrieving unit 3, calculating an occurrence frequency TF of one particular word in one unified particular hypertext document for each particular word and each unified particular hypertext document on condition that an occurrence frequency of the particular word appearing in an heading portion of the unified particular hypertext document is doubled, calculating an inverse document frequency IDF defined as an inverse value of the number of particular hypertext documents, in which one particular word appears, for each particular word, calculating a product TF*IDF of one occurrence frequency TF and one inverse document frequency IDF, summing a plurality of products for all particular words to produce a summed product as an estimated value for each particular hypertext document, determining a plurality of importance degrees of the unified particular hypertext documents according to the estimated values, determining the ranking of the particular hypertext documents according to the importance degrees for the unified particular hypertext documents and preparing an index of one particular hypertext document for each of the particular hypertext documents, and a retrieval result displaying unit 63 for displaying the indexes of the particular hypertext documents in the ranked order determined in the document ranking determining unit 62 as a retrieval result.

In the above configuration, a heading portion of each unified particular hypertext document is composed of a title of one particular hypertext document corresponding to the unified particular hypertext document and one or more anchor sentences of particular parent documents having a reference relationship with the particular hypertext document. For example, in cases where a particular word agreeing with one keyword appears six times in one unified particular hypertext document on condition that the particular word appears three times in the heading portion of the unified particular hypertext document, the particular word appearing in the heading portion of the unified particular hypertext document is double-counted each time the particular word appears, so that an occurrence frequency TF of the particular word in the unified particular hypertext document is equal to 9. Thereafter, one particular hypertext document corresponding to the unified particular hypertext document is ranked according to the occurrence frequency TF=9.

Accordingly, because the heading portion of the hypertext document normally indicates a feature of the hypertext document very well and the particular word appearing in the heading portion of the unified particular hypertext document is double-counted, reliability for the ranking of the particular hypertext documents can be moreover heightened.

In an HTML hypertext document written by the hypertext mark-up language, a small index is expressed by a character string surrounded by "<h1>" and "</h1>". Therefore, it is applicable that the small index be included in the heading portion of the HTML hypertext document.

In this embodiment, the occurrence frequency of the particular word appearing in the heading portion of the unified particular hypertext document is doubled. However, it is applicable that the occurrence frequency of the particular word be increased three or more times.

(Eighth Embodiment)

In the hypertext documents of the world wide web, there is a special hypertext document in which a number of anchor sentences exist and any other sentences do not exist. This special hypertext document is generally called a link page. Even though the link page is retrieved and displayed, any useful information meeting a user's retrieval intention does not exist in the link page. Therefore, an occurrence number of a particular word in the link page is lowered to zero in this embodiment.

Figure 15:
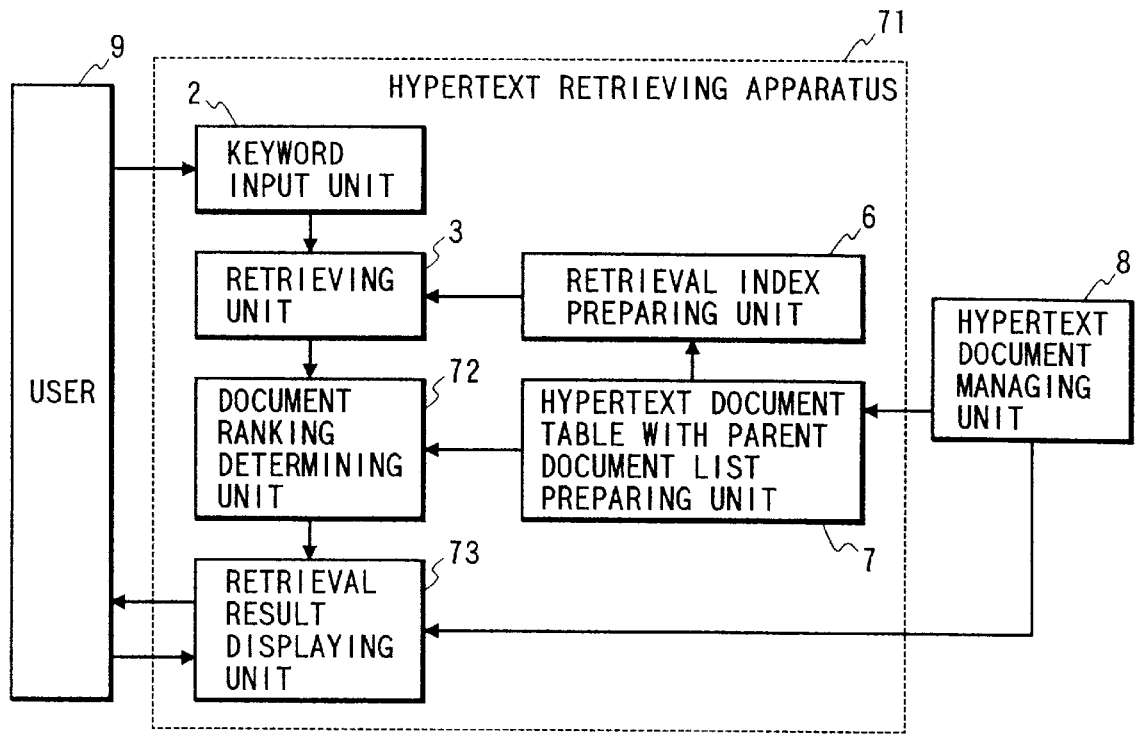
FIG. 15 is a block diagram of a hypertext retrieving apparatus according to an eighth embodiment of the present invention.

FIG. 15 is a block diagram of a hypertext retrieving apparatus according to an eighth embodiment of the present invention.

As shown in FIG. 15, a hypertext retrieving apparatus 71 for retrieving one or more hypertext documents likely to meet a user's retrieval request from a large volume of hypertext documents stored in the hypertext document managing unit 8, comprises the hypertext document table with parent document list preparing unit 7, the retrieval index preparing unit 6, the keyword input unit 2, the retrieving unit 3, a document ranking determining unit 72 for unifying one particular hypertext document and one or more particular parent documents corresponding to the particular hypertext document to a unified particular hypertext document according to the document information of the hypertext document table prepared by the hypertext document table with parent document list preparing unit 7 for each of the particular hypertext documents obtained in the retrieving unit 3, specifying a link page from among the particular hypertext documents, calculating an occurrence frequency TF of one particular word in one unified particular hypertext document for each particular word and each unified particular hypertext document on condition that an occurrence frequency of the particular word in the link page is reduced by one each time the particular word is found out in the link page treated as one particular parent document of the unified particular hypertext document, calculating an inverse document frequency IDF defined as an inverse value of the number of particular hypertext documents, in which one particular word appears, for each particular word, calculating a product TF*IDF of one occurrence frequency TF and one inverse document frequency IDF, summing a plurality of products for all particular words to produce a summed product as an estimated value for each particular hypertext document, determining a plurality of importance degrees of the unified particular hypertext documents according to the estimated values, determining the ranking of the particular hypertext documents according to the importance degrees for the unified particular hypertext documents and preparing an index of one particular hypertext document for each of the particular hypertext documents, and a retrieval result displaying unit 73 for displaying the indexes of the particular hypertext documents in the ranked order determined in the document ranking determining unit 62 as a retrieval result.

In the above configuration, the hypertext document D82 is, for example, a link page relating to the particular word "apple" and is composed of ten anchor sentences. Therefore, ten reference documents respectively having a reference relationship with the hypertext document D82 exist. When an occurrence frequency of the particular word "apple" in a unified particular hypertext document composed of one reference document treated as one particular hypertext document and the hypertext document D82 treated as one particular parent document is calculated, an occurrence frequency of the particular word "apple" in the hypertext document D82 treated as one particular hypertext document is reduced by one each time the particular word "apple" is found out in the particular parent document D82. This reducing operation is performed for all reference documents treated as the particular hypertext documents.

Therefore, even though the particular word "apple" appears in the hypertext document D82 many times, the occurrence frequency of the particular word "apple" in the hypertext document D82 is necessarily reduced to zero, and the hypertext document D82 is ranked to the lowest class.

Accordingly, any particular hypertext document functioning as one link page can be always ranked to the lowest class.

(Ninth Embodiment)

There is a long hypertext document composed of a plurality of blocks respectively corresponding to a meaning, and a reference label is arranged in the top of each block of the long hypertext document. In this embodiment, the long hypertext document is divided into the plurality of blocks, and a hypertext document table corresponding to each block of the long hypertext document is prepared.

Figure 16:
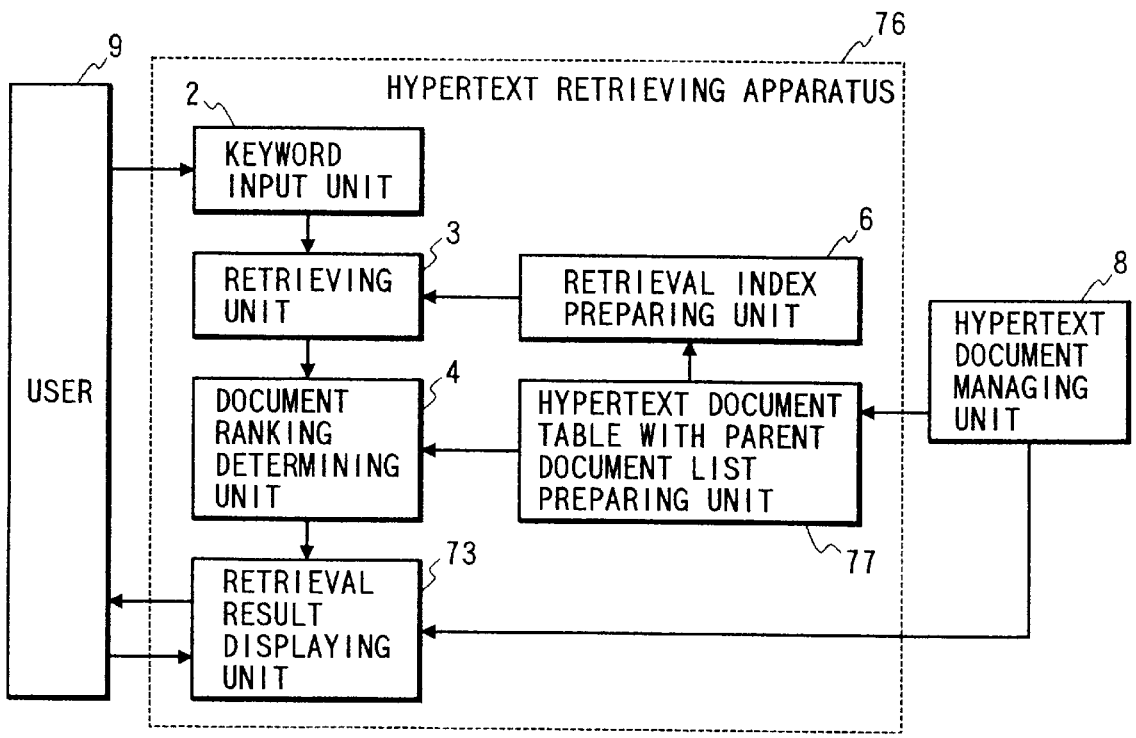
FIG. 16 is a block diagram of a hypertext retrieving apparatus according to a ninth embodiment of the present invention.

FIG. 16 is a block diagram of a hypertext retrieving apparatus according to a ninth embodiment of the present invention.

As shown in FIG. 16, a hypertext retrieving apparatus 76 for retrieving one or more hypertext documents likely to meet a user's retrieval request from a large volume of hypertext documents stored in the hypertext document managing unit 8, comprises a hypertext document table with parent document list preparing unit 77 for analyzing the hypertext documents having the reference relationships which are managed by the hypertext document managing unit 8, specifying a long hypertext document composed of a plurality of blocks respectively corresponding to a meaning, setting each block of the long hypertext document as one hypertext document corresponding to one meaning, preparing hypertext document information in which one or more parent document identifiers identifying one or more parent documents and anchor sentences of the parent documents are listed with one hypertext document identifier identifying one hypertext document and a document storing position of the hypertext document, for each of the hypertext documents, and preparing a hypertext document table of the hypertext document information for all hypertext documents managed by the hypertext document managing unit 8, the retrieval index preparing unit 6, the keyword input unit 2, the retrieving unit 3, the document ranking determining unit 4 and the retrieval result displaying unit 73.

Figure 17:
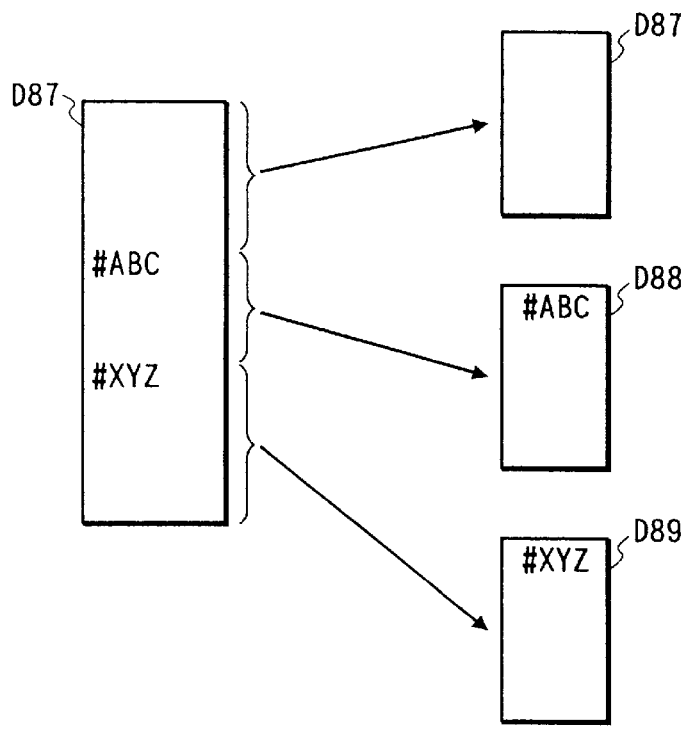
FIG. 17 shows the division of a long hypertext document with one or more reference labels.

In the above configuration, as shown in FIG. 17, in cases where a long hypertext document D87 composed of a plurality of blocks respectively corresponding to a meaning exists in the hypertext documents managed by the hypertext document managing unit 8, the long hypertext document D87 is specified by the hypertext document table with parent document list preparing unit 77, and one or more reference labels respectively arranged on the top of one block of the long hypertext document D87 are found out. Thereafter, the long hypertext document D87 is divided into the plurality of blocks, and each block of the long hypertext document D87 is set as one hypertext document D87, D88 or D89. In this case, when the user reads a character string "ABC" or "XYZ" of an anchor sentence of one hypertext document, the user can immediately refer to the reference label such as "#ABC" or "#XYZ" of another hypertext document. Thereafter, a hypertext document table of the hypertext document information for all hypertext documents is prepared in the same manner as in the first embodiment.

Accordingly, even though a long hypertext document composed of a plurality of blocks respectively corresponding to a meaning exists in the hypertext documents, because the long hypertext document is divided into the blocks and each block of the long hypertext document is set as one hypertext document to prepare the hypertext document information for each block of the long hypertext document, the hypertext documents respectively relating to one meaning can be ranked, so that the user can easily retrieve a group of hypertext documents likely to meet his request.

In this embodiment, in cases where a small index expressed by a character string surrounded by "<h1>" and "</h1>" is used in a long hypertext document, it is applicable that the long hypertext document be divided into a plurality of blocks on condition that one reference label or one small index is arranged on the top of each block.

(Tenth Embodiment)

In cases where the user intends to again retrieve a plurality of hypertext documents by changing an initial keyword to another keyword which relates to a plurality of particular hypertext documents displayed according to the initial keyword, the user generally desires to acknowledge one or more words frequently appearing in the particular hypertext documents. Therefore, in this embodiment, one or more words frequently appearing in the particular hypertext documents are displayed.

Figure 18:
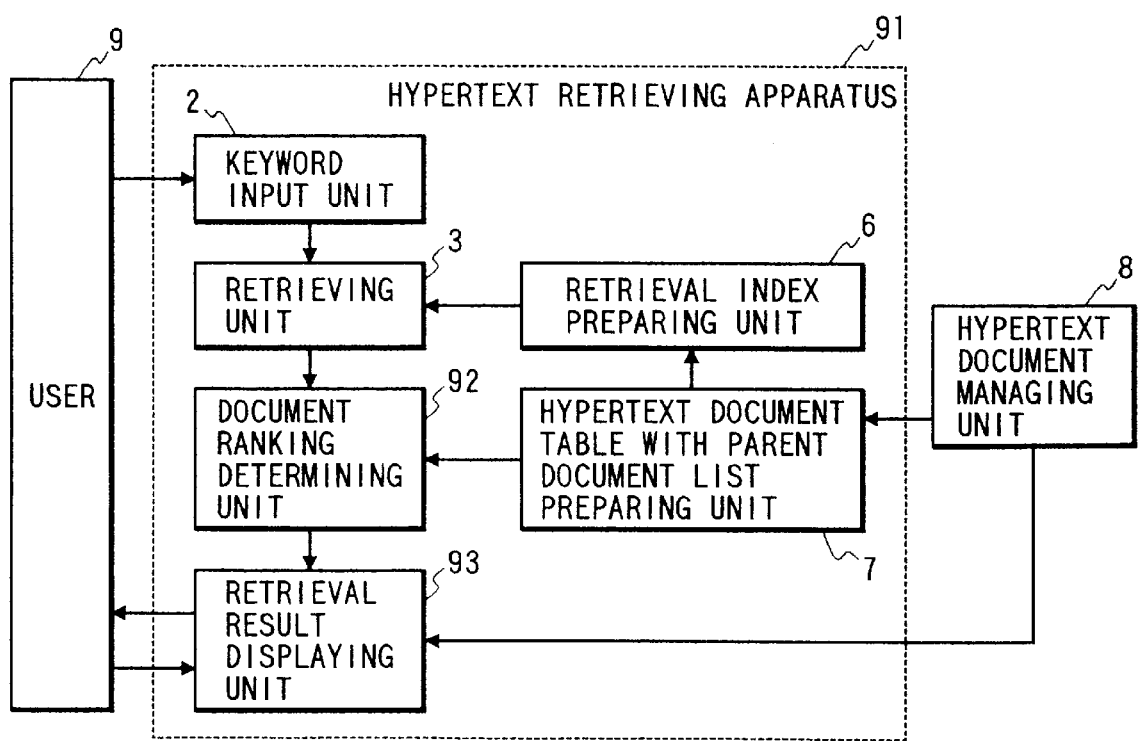
FIG. 18 is a block diagram of a hypertext retrieving apparatus according to a tenth embodiment of the present invention.

FIG. 18 is a block diagram of a hypertext retrieving apparatus according to a tenth embodiment of the present invention.

As shown in FIG. 18, a hypertext retrieving apparatus 91 for retrieving one or more hypertext documents likely to meet a user's retrieval request from a large volume of hypertext documents stored in the hypertext document managing unit 8, comprises the hypertext document table with parent document list preparing unit 7, the retrieval index preparing unit 6, the keyword input unit 2, the retrieving unit 3, a document ranking determining unit 92 for unifying one particular hypertext document and one or more particular parent documents corresponding to the particular hypertext document to a unified particular hypertext document according to the document information of the hypertext document table prepared by the hypertext document table with parent document list preparing unit 7 for each of the particular hypertext documents obtained in the retrieving unit 3, calculating an occurrence frequency TF of one particular word in one unified particular hypertext document for each particular word and each unified particular hypertext document, calculating an inverse document frequency IDF defined as an inverse value of the number of particular hypertext documents, in which one particular word appears, for each particular word, calculating a product TF*IDF of one occurrence frequency TF and one inverse document frequency IDF, summing a plurality of products for all particular words to produce a summed product as an estimated value for each particular hypertext document, determining a plurality of importance degrees of the unified particular hypertext documents according to the estimated values, determining the ranking of the particular hypertext documents according to the importance degrees for the unified particular hypertext documents, preparing an index of one particular hypertext document for each of the particular hypertext documents, selecting a plurality of high-ranking hypertext documents from the particular hypertext documents, extracting a plurality of related words listed in a plurality of word lists of pieces of hypertext document information of the hypertext document table corresponding to the high-ranking hypertext documents, calculating an occurrence frequency TF of one related word in one high-ranking hypertext document for each related word and each high-ranking hypertext document, calculating an inverse document frequency IDF defined as an inverse value of the number of high-ranking hypertext documents, in which one related word appears, for each related word, calculating a sum of a plurality of products TF*IDF for all high-ranking hypertext documents to produce a summed product as an importance degree for each related word, comparing the importance degrees of the related words with each other, selecting a plurality of high-ranking related words of which the importance degrees are higher than those of other related words, and preparing a hypertext mark-up language (HTML) document in which a plurality of keyword selection buttons corresponding to the high-ranking related words are arranged in the decreasing order of the importance degrees of the high-ranking related words to select one high-ranking related word by pushing one keyword selection button, and a retrieval result displaying unit 93 for displaying the indexes of the particular hypertext documents in the ranked order determined in the document ranking determining unit 92 as a retrieval result on a result displaying window W1 and displaying the HTML document prepared by the document ranking determining unit 92 on a high-ranking related word selecting window W2.

In the above configuration, in cases where the tenth embodiment and the third embodiment are combined, as shown in FIG. 19, when a keyword "apple" is input to the keyword input unit 2, a plurality of indexes of particular hypertext documents such as documents D83, D85 and D86 and a plurality of indexes of parent documents such as documents D80 and D81 are, for example, displayed on the result displaying window W1 in the same manner as in the third embodiment. Thereafter, in the document ranking determining unit 92, ten high-ranking hypertext documents are selected from the particular hypertext documents, a plurality of related words listed in a plurality of word lists of pieces of hypertext document information of the hypertext document table corresponding to the high-ranking hypertext documents are extracted, a sum of a plurality of products TF*IDF for all high-ranking hypertext documents is calculated for each related word, and importance degrees for the related words are determined. Thereafter, ten high-ranking related words "Shinshu", "farmer", "product", "Aomori", "manure", "farm", "festival", "Nebuta", "Nagano" and "Olympics" are selected from the related words, an HTML document in which ten keyword selection buttons corresponding to the high-ranking related words are arranged in the decreasing order of the importance degrees of the high-ranking related words is prepared, and the HTML document is displayed on the high-ranking related word selecting window W2.

Therefore, when the user push the keyword button corresponding to the high-ranking related word "Shinshu", the word "Shinshu" indicating an apple-producing district is input to the keyword input unit 2 as a keyword, importance degrees of a plurality of particular hypertext documents corresponding to the keyword "Shinshu" are determined, and the particular hypertext documents arranged in the decreasing order of the importance degrees are displayed on the result displaying window W1 in the same manner as in the first embodiment.

Accordingly, even though the user cannot initially bring an appropriate keyword to his mind, the user can select one or more keywords closer to his retrieval intention. Also, the user can change his retrieval intention by referring to the high-ranking related words, and a plurality of particular hypertext documents corresponding to a new keyword selected by the user according to his new retrieval intention can be displayed.

In this case, the user can push the keyword selection button by using a pointing device without using a keyboard. Also, the keyword selection buttons are embodied by operating a JAVA script in which the high-ranking related words are added to a text box, a "clear" button is embodied by operating a JAVA script in which one high-ranking related word added to the text box is cleared, an "initial condition" button is embodied by operating a JAVA script in which the high-ranking related words added to the text box are returned to an initial group of keywords such as "apple", and an "re-retrieval" button is embodied by operating a JAVA script in which a retrieval operation is again operated by using one or more words added to the text box as one or more keywords.

In this embodiment, the high-ranking hypertext documents are selected from the particular hypertext documents. However, it is applicable that the high-ranking hypertext documents be selected from the particular hypertext documents and the parent documents. In this case, a plurality of related words can be widely collected from a plurality of hypertext documents having a reference relationship with each other.

(Eleventh Embodiment)

In the tenth embodiment, the importance degrees of the related words are determined without any connection with the keyword initially input by the user. However, in cases where the user desires to select related word having a close correlation with the keyword, it is preferred that a related word having a close correlation with a keyword be preferentially selected as a high-ranking related word. Therefore, in this embodiment, an occurrence frequency of a related word having a close correlation with a keyword is doubled to heighten an importance degree of the related word.

Figure 20:
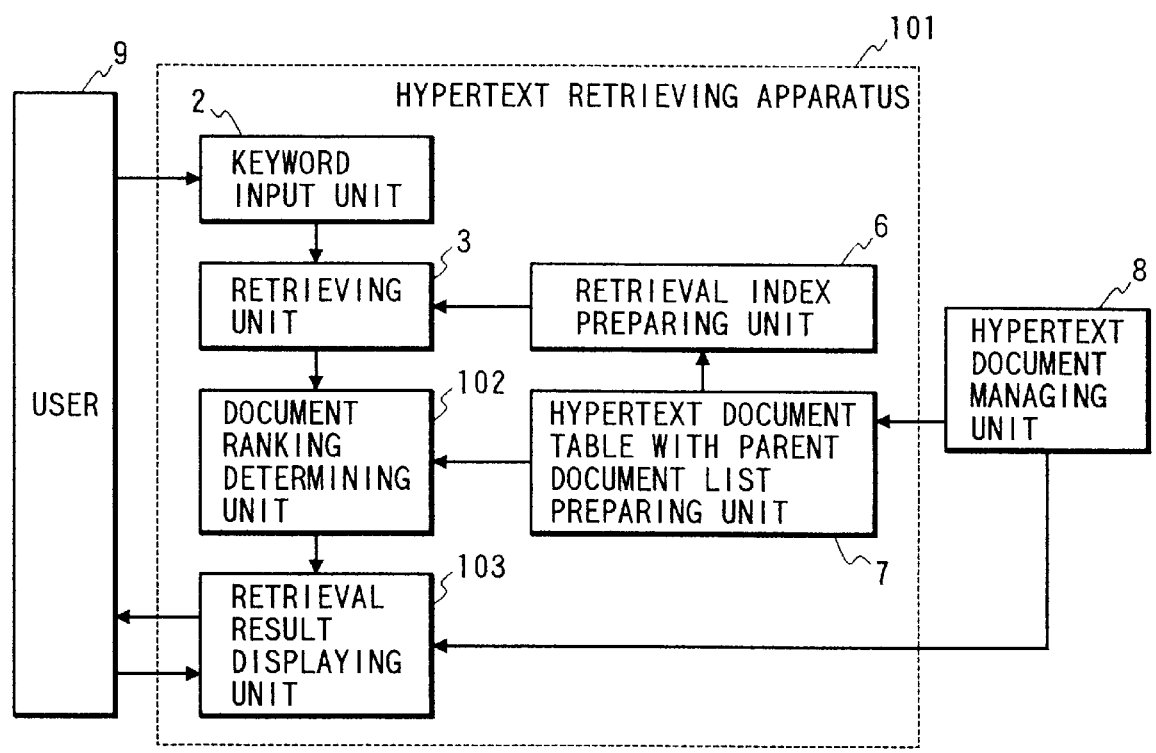
FIG. 20 is a block diagram of a hypertext retrieving apparatus according to an eleventh embodiment of the present invention.

FIG. 20 is a block diagram of a hypertext retrieving apparatus according to an eleventh embodiment of the present invention.

As shown in FIG. 20, a hypertext retrieving apparatus 101 for retrieving one or more hypertext documents likely to meet a user's retrieval request from a large volume of hypertext documents stored in the hypertext document managing unit 8, comprises the hypertext document table with parent document list preparing unit 7, the retrieval index preparing unit 6, the keyword input unit 2, the retrieving unit 3, a document ranking determining unit 102 for unifying one particular hypertext document and one or more particular parent documents corresponding to the particular hypertext document to a unified particular hypertext document according to the document information of the hypertext document table prepared by the hypertext document table with parent document list preparing unit 7 for each of the particular hypertext documents obtained in the retrieving unit 3, calculating an occurrence frequency TF of one particular word in one unified particular hypertext document for each particular word and each unified particular hypertext document, calculating an inverse document frequency IDF defined as an inverse value of the number of particular hypertext documents, in which one particular word appears, for each particular word, calculating a product TF*IDF of one occurrence frequency TF and one inverse document frequency IDF, summing a plurality of products for all particular words to produce a summed product as an estimated value for each particular hypertext document, determining a plurality of importance degrees of the unified particular hypertext documents according to the estimated values, determining the ranking of the particular hypertext documents according to the importance degrees for the unified particular hypertext documents, preparing an index of one particular hypertext document for each of the particular hypertext documents, selecting a plurality of high-ranking hypertext documents from the particular hypertext documents, extracting a plurality of related words listed in a plurality of word lists of pieces of hypertext document information of the hypertext document table corresponding to the high-ranking hypertext documents, calculating an occurrence frequency TF of one related word in one high-ranking hypertext document for each related word and each high-ranking hypertext document on condition that the related word is double-counted when the related word is placed within a distance of 40 letters from one keyword, calculating an inverse document frequency IDF defined as an inverse value of the number of high-ranking hypertext documents, in which one related word appears, for each related word, calculating a sum of a plurality of products TF*IDF for all high-ranking hypertext documents to produce a summed product as an importance degree for each related word, comparing the importance degrees of the related words with each other, selecting a plurality of high-ranking related words of which the importance degrees are higher than those of other related words, and preparing a hypertext mark-up language (HTML) document in which a plurality of keyword selection buttons corresponding to the high-ranking related words are arranged in the decreasing order of the importance degrees of the high-ranking related words to select one high-ranking related word by pushing one keyword selection button, and a retrieval result displaying unit 103 for displaying the indexes of the particular hypertext documents in the ranked order determined in the document ranking determining unit 92 as a retrieval result on a result displaying window W1 and displaying the HTML document prepared by the document ranking determining unit 102 on a high-ranking related word selecting window W2.

In the above configuration, after the related words are extracted in the same manner as in the tenth embodiment, an occurrence frequency TF of one related word in one high-ranking hypertext document is calculated for each related word and each high-ranking hypertext document. In this case, when the related word is placed within a distance of 40 letters from one keyword "apple", the related word is double-counted. Therefore, because the related word "Shinshu" indicating an apple-producing district or the related word "farmer" often appears within a distance of 40 letters from one keyword "apple" and because the related word "Nagano" indicating an apple-producing prefecture or the related word "Olympics" indicating a festival held in the Nagano in 1998 is hardly appears within a distance of 40 letters from one keyword "apple", as shown in FIG. 21, the related words "Shinshu" and "farmer" are reliably displayed on the head portion of the high-ranking related word selecting window W2, and the related words "Nagano" and "Olympics" are displayed on the rear portion of the high-ranking related word selecting window W2 even though the related words "Nagano" and "Olympics" frequently appear in the particular hypertext documents.

Accordingly, one or more related words having a strong relationship with the keyword can be displayed in high-ranking positions, and one or more related words corresponding to a user's retrieval intention differing from the initial retrieval intention can be displayed in low-ranking positions.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A hypertext document retrieving apparatus for retrieving a plurality of particular hypertext documents likely to meet a user's retrieval request from a group of hypertext documents having reference relationships with each other in which one hypertext document having an anchor sentence functions as a parent document for another hypertext document functioning as a reference document and a user refers to one reference document after the user selects one anchor sentence of one parent document corresponding to the reference document, comprising:

hypertext document table preparing means for preparing hypertext document information, in which one hypertext document identifier identifying one hypertext document, a body of the hypertext document, a parent document identifier identifying a parent document corresponding to the hypertext document functioning as one reference document and an anchor sentence of the parent document are registered, for each of the hypertext documents and preparing a hypertext document table of the hypertext document information for the hypertext documents;

retrieval index preparing means for recognizing a plurality of words appearing in each of the hypertext documents and the parent documents according to the hypertext document table prepared by the hypertext document table preparing means, recognizing a plurality of occurrence positions of the words in each of the hypertext documents and the parent documents according to the hypertext document table, preparing word information, composed of one or more occurrence document identifiers identifying one or more hypertext documents in which one word appears and occurrence positions of the word in the hypertext documents and one or more anchor sentences of one or more parent documents corresponding to the hypertext documents, for each of the words, and preparing a retrieval index of pieces of word information for the words;

keyword receiving means for receiving a keyword indicating the user's retrieval request;

retrieving means for retrieving particular word information corresponding to the keyword received by the keyword receiving means from the retrieval index prepared by the retrieval index preparing means and retrieving a plurality of particular occurrence document identifiers identifying a plurality of particular hypertext documents in which the keyword appears and a plurality of particular occurrence positions of the keyword in the particular hypertext documents and one or more particular anchor sentences of one or more particular parent documents corresponding to the particular hypertext documents from the particular word information;

document ranking determining means for specifying the particular hypertext documents which are identified by the particular occurrence document identifiers retrieved by the retrieving means, retrieving pieces of particular hypertext document information for the particular hypertext documents from the hypertext document table prepared by the hypertext document table preparing means, unifying one particular hypertext document and one or more particular parent documents corresponding to the particular hypertext document to a unified hypertext document for each of the particular hypertext documents, calculating an occurrence frequency of the keyword in one unified hypertext document for each unified hypertext document, determining a plurality of importance degrees of the unified hypertext documents according to the occurrence frequencies in the unified hypertext documents, setting one importance degree of one unified hypertext document as an importance degree of one particular hypertext document corresponding to the unified hypertext document for each unified hypertext document and determining the ranking of the particular hypertext documents according to the importance degrees of the particular hypertext documents; and retrieval result displaying means for displaying a plurality of indexes of the particular hypertext documents in a ranked order corresponding to the ranking of the particular hypertext documents determined by the document ranking determining means as a retrieval result.

2. A hypertext document retrieving apparatus according to claim 1 in which an index of one particular parent document corresponding to one particular hypertext document is displayed with the index of the particular hypertext document by the retrieval result displaying means for each of the particular hypertext documents.

3. A hypertext document retrieving apparatus according to claim 1 in which a plurality of particular hypertext documents corresponding to the same particular parent document are reset to the same rank as a highest rank among the ranks determined for the particular hypertext documents by the document ranking determining means, and the particular hypertext documents set to the same rank are displayed with the particular parent document in a group by the retrieval result displaying means.

4. A hypertext document retrieving apparatus according to claim 1 in which a plurality of particular hypertext documents corresponding to the same particular parent document are reset to a same rank according to a sum of the importance degrees for the particular hypertext documents by the document ranking determining means, and the particular hypertext documents set to the same rank are displayed with the particular parent document in a group by the retrieval result displaying means.

5. A hypertext document retrieving apparatus according to claim 1 in which each of the unified hypertext documents is formed by the document ranking determining means by unifying one or more anchor sentences of one or more particular parent documents corresponding to one particular hypertext document and the particular hypertext document.

6. A hypertext document retrieving apparatus according to claim 1 in which a particular sentence or a particular phrase including the keyword is extracted from each of the particular hypertext documents by the document ranking determining means, and a summary in which one particular sentence or one particular phrase of one particular hypertext document is written in succession to a top sentence or a top phrase of the particular hypertext document is displayed with the index of the particular hypertext document for each of the particular hypertext documents.

7. A hypertext document retrieving apparatus according to claim 1 in which the importance degree of each of the unified hypertext documents is determined by the document ranking determining means by calculating a sum of an occurrence frequency of the keyword in one hypertext document and an occurrence frequency of the keyword in one parent document corresponding to the hypertext document for each of the parent documents corresponding to the hypertext document, selecting a maximum sum among the sums for the parent documents, specifying one particular parent document corresponding to the maximum sum, determining one importance degree for a combination of the hypertext document and the particular parent document according to the maximum sum and regarding the importance degree as one importance degree of one unified hypertext document corresponding to the hypertext document.

8. A hypertext document retrieving apparatus according to claim 1 in which the occurrence frequency of the keyword in each unified hypertext document is calculated by the document ranking determining means by double-counting the keyword appearing in one or more anchor sentences of one or more particular parent documents corresponding to the unified hypertext document.

9. A hypertext document retrieving apparatus according to claim 1 in which the occurrence frequency of the keyword in one hypertext document functioning as a link page composed of one or more anchor sentences is set to zero by the document ranking determining means.

10. A hypertext document retrieving apparatus according to claim 1 in which one hypertext document having contents corresponding to a plurality of meanings respectively identified by a reference label is divided into a plurality of blocks by the hypertext document table preparing means to include one reference label in a top of each block, and one hypertext document information is prepared for each block of the hypertext document by the hypertext document table preparing means.

11. A hypertext document retrieving apparatus according to claim 1 in which a predetermined number of high-ranking particular hypertext documents are selected from among the particular hypertext documents by the document ranking determining means, a plurality of related words appearing in the high-ranking particular hypertext documents are extracted from the high-ranking particular hypertext documents by the document ranking determining means, a plurality of importance degrees of the related words are calculated from a plurality of occurrence frequencies of the related words in the high-ranking particular hypertext documents by the document ranking determining means, a predetermined number of high-ranking related words are selected from the related words ranked according to the importance degrees of the related words by the document ranking determining means, and a plurality of selection buttons for the high-ranking related words are displayed with the indexes of the particular hypertext documents by the retrieval result displaying means.

12. A hypertext document retrieving apparatus according to claim 1 in which a predetermined number of high-ranking particular hypertext documents are selected from among the particular hypertext documents by the document ranking determining means, a plurality of related words appearing in the high-ranking particular hypertext documents and a plurality of particular parent documents corresponding to the high-ranking particular hypertext documents are extracted from the high-ranking particular hypertext documents by the document ranking determining means, a plurality of importance degrees of the related words are calculated from a plurality of occurrence frequencies of the related words in the high-ranking particular hypertext documents and the particular parent documents by the document ranking determining means, a predetermined number of high-ranking related words are selected from the related words ranked according to the importance degrees of the related words by the document ranking determining means, and a plurality of selection buttons for the high-ranking related words are displayed with the indexes of the particular hypertext documents by the retrieval result displaying means.

13. A hypertext document retrieving apparatus according to claim 1 in which a predetermined number of high-ranking particular hypertext documents are selected from among the particular hypertext documents by the document ranking determining means, a plurality of related words appearing in the high-ranking particular hypertext documents are extracted from the high-ranking particular hypertext documents by the document ranking determining means, an occurrence frequency of each related word in the high-ranking particular hypertext documents is calculated by the document ranking determining means on condition that the related word appearing in one high-ranking particular hypertext document is double-counted in cases where an occurrence position of the related word is near to an occurrence position of the keyword, a plurality of importance degrees of the related words are calculated from the occurrence frequencies of the related words by the document ranking determining means, a predetermined number of high-ranking related words are selected from the related words ranked according to the importance degrees of the related words by the document ranking determining means, and a plurality of selection buttons for the high-ranking related words are displayed with the indexes of the particular hypertext documents by the retrieval result displaying means.

14. A hypertext document retrieving apparatus according to claim 1 in which a predetermined number of high-ranking particular hypertext documents are selected from among the particular hypertext documents by the document ranking determining means, a plurality of related words appearing in the high-ranking particular hypertext documents and a plurality of particular parent documents corresponding to the high-ranking particular hypertext documents are extracted from the high-ranking particular hypertext documents by the document ranking determining means, an occurrence frequency of each related word in the high-ranking particular hypertext documents and the particular parent documents is calculated by the document ranking determining means on condition that the related word appearing in one high-ranking particular hypertext document or one particular parent document is double-counted in cases where an occurrence position of the related word is near to an occurrence position of the keyword, a plurality of importance degrees of the related words are calculated from the occurrence frequencies of the related words by the document ranking determining means, a predetermined number of high-ranking related words are selected from the related words ranked according to the importance degrees of the related words by the document ranking determining means, and a plurality of selection buttons for the high-ranking related words are displayed with the indexes of the particular hypertext documents by the retrieval result displaying means.

15. A hypertext document retrieving apparatus according to claim 1 in which a plurality of keywords are received by the keyword receiving means, an occurrence frequency TF of one keyword in one unified hypertext document is calculated by the document ranking determining means for each keyword and each unified hypertext document, an inverse document frequency IDF defined as an inverse value of the number of particular hypertext documents in which one keyword appears is calculated by the document ranking determining means for each keyword, a product TF*IDF of one occurrence frequency TF and one inverse document frequency IDF is calculated by the document ranking determining means, a plurality of products for the keywords are summed by the document ranking determining means to produce a summed product as an estimated value for each unified particular hypertext document, and the importance degrees of the unified hypertext documents are determined according to the estimated values by the document ranking determining means.

16. A hypertext document retrieving apparatus according to claim 15 in which one estimated value for one unified particular hypertext document is increased to heighten the rank of the particular hypertext document in cases where two or more keywords appear in the unified particular hypertext document or a distance of two keywords in the unified particular hypertext document is within a predetermined number of words.

* * * * *